(12) United States Patent
Yuda et al.

(10) Patent No.: US 10,200,940 B2
(45) Date of Patent: Feb. 5, 2019

(54) WIRELESS BASE STATION, WIRELESS TERMINAL, AND COMMUNICATION CONTROL METHOD

(71) Applicant: Panasonic Intellectual Property Corporation of America, Torrance, CA (US)

(72) Inventors: Yasuaki Yuda, Kanagawa (JP); Masayuki Hoshino, Kanagawa (JP); Kenichi Higuchi, Saitama (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 28 days.

(21) Appl. No.: 15/694,254

(22) Filed: Sep. 1, 2017

(65) Prior Publication Data

US 2017/0367038 A1 Dec. 21, 2017

Related U.S. Application Data

(63) Continuation of application No. PCT/JP2016/001806, filed on Mar. 29, 2016.

(30) Foreign Application Priority Data

May 20, 2015 (JP) ................................. 2015-102985

(51) Int. Cl.
*H04W 48/16* (2009.01)
*H04W 24/08* (2009.01)
(Continued)

(52) U.S. Cl.
CPC .......... *H04W 48/16* (2013.01); *H04W 24/08* (2013.01); *H04W 48/06* (2013.01); (Continued)

(58) Field of Classification Search
CPC ..... H04W 24/08; H04W 48/06; H04W 48/16; H04W 72/042; H04W 72/0453; H04W 88/02; H04W 88/08
See application file for complete search history.

(56) References Cited

U.S. PATENT DOCUMENTS

| | | | | |
|---|---|---|---|---|
| 2013/0336229 A1* | 12/2013 | Kakadia | ............ | H04W 72/1257 370/329 |
| 2015/0173084 A1* | 6/2015 | Chou | ................ | H04W 52/0222 370/252 |
| 2017/0367038 A1* | 12/2017 | Yuda | ..................... | H04W 48/16 |

FOREIGN PATENT DOCUMENTS

JP  2014-045331  3/2014

OTHER PUBLICATIONS

International Search Report of PCT application No. PCT/JP2016/001806 dated Jun. 21, 2016.

(Continued)

*Primary Examiner* — Benjamin H Elliott, IV
(74) *Attorney, Agent, or Firm* — Seed IP Law Group LLP

(57) ABSTRACT

A wireless base station transmits first information indicating an allocation policy that determines system performance and second information regarding an allocated bandwidth that is allocated to a wireless terminal in a case where the allocation policy is applied, receives, from each of a plurality of wireless terminals, third information regarding a serving base station candidate and throughput that is achieved in a case where the wireless terminal is connected to the serving base station candidate, and controls, on the basis of the third information, a connection to a wireless terminal having the greatest throughput.

10 Claims, 10 Drawing Sheets

(51) Int. Cl.
  *H04W 72/04*   (2009.01)
  *H04W 48/06*   (2009.01)
  *H04W 88/02*   (2009.01)
  *H04W 88/08*   (2009.01)

(52) U.S. Cl.
  CPC ...... *H04W 72/042* (2013.01); *H04W 72/0453* (2013.01); *H04W 88/02* (2013.01); *H04W 88/08* (2013.01)

(56) References Cited

OTHER PUBLICATIONS

Yoshitaka Ikeda et al., "Proportional Fair-Based Joint Optimization of Cell Association and Inter-cell Interference Coordination for Heterogeneous Networks", IEICE Technical Report, SIP2013-134, RCS2013-304, Jan. 2014.

Jeonghoon Mo et al., "Fair end-to-end window-based congestion control", IEEE/ACM Trans. Networking, vol. 8, No. 5, pp. 556-567, Oct. 2000.

\* cited by examiner

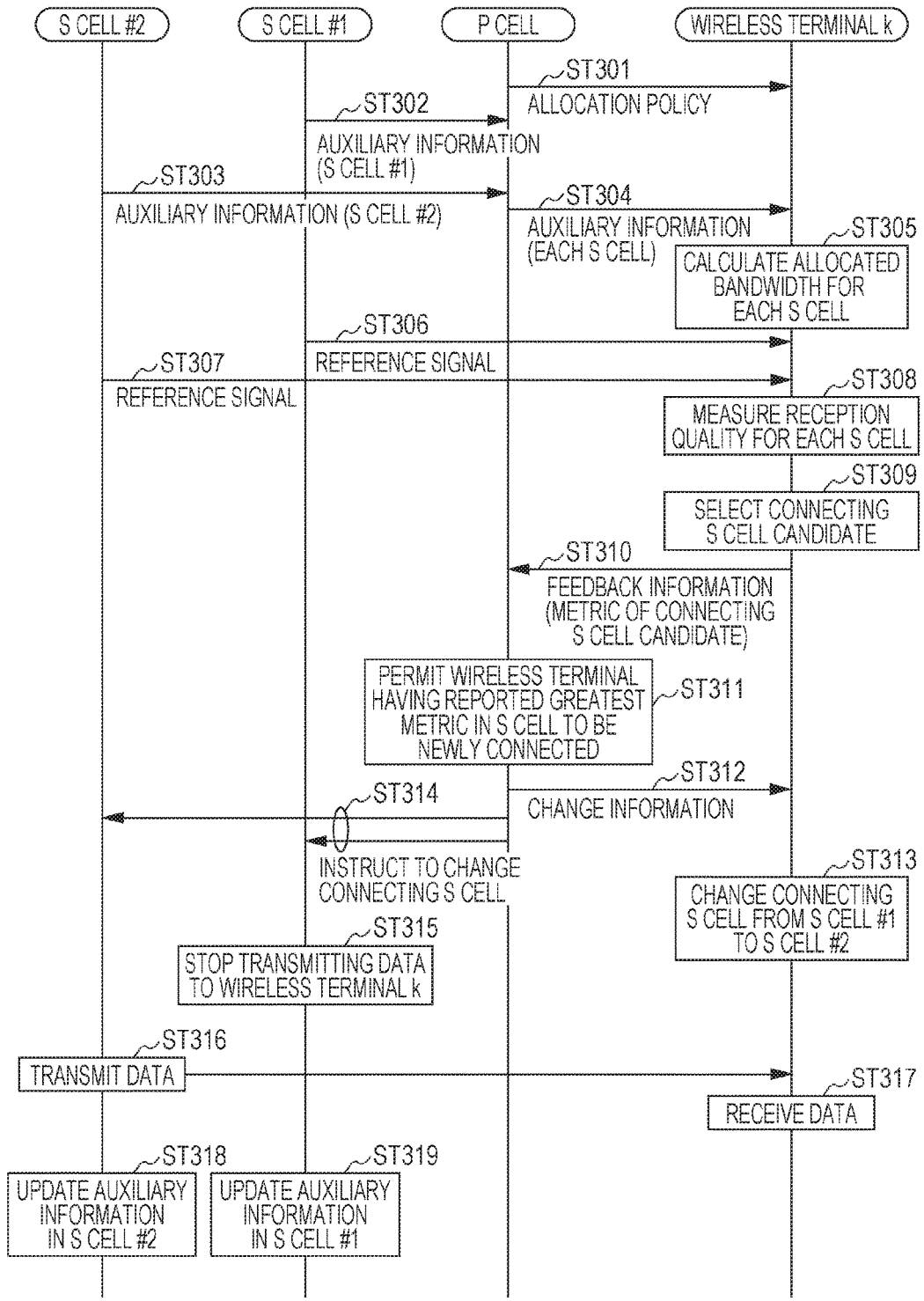

WIRELESS BASE STATION, WIRELESS TERMINAL, AND COMMUNICATION CONTROL METHOD

BACKGROUND

1. Technical Field

The present disclosure relates to communication apparatuses and communication methods and, in particular, to a wireless base station, a wireless terminal, and a communication control method.

2. Description of the Related Art

A mobile communication system has been required to efficiently accommodate increasing radio traffic through a heterogeneous network configuration in which small cells are densely arranged in an overlapping manner in an area within a wide-area macrocell where radio traffic is concentrated.

In a conventional mobile communication system, a wireless terminal is connected to a wireless base station that insures a maximum of received power. For example, in an LTE (Long Term Evolution) system, a wireless terminal is connected to a wireless base station that insures a maximum of RSRP (reference signal received power), which is the received power of a reference signal that is transmitted from the wireless base station.

With such a serving base station selecting method, a wireless terminal has its received power at the maximum; therefore, from the point of view of the reception quality of the wireless terminal, the wireless terminal is connected to the best wireless base station. Meanwhile, from the point of view of the whole system, there is a case where this serving base station selecting method cannot necessarily be said to be an optimum selecting method.

For example, suppose a situation where a wireless terminal is located near a wireless base station A in a case where a large number of wireless terminals are connected to the wireless base station A and a small number of wireless terminals are connected to an adjacent wireless base station B. In this case, this wireless terminal has its received power at the maximum; therefore, the wireless terminal can be said to be connected to the best wireless base station A. However, since a large number wireless terminals are connected to the wireless base station A, this wireless terminal must share radio resources of the wireless base station A with a large number of wireless terminals. Consequently, only limited radio resources are allocated to each wireless terminal, with the result that high throughput cannot be achieved. Meanwhile, in a case where the wireless terminal is connected to the wireless base station B, the wireless terminal is lower in received power than in a case where it is connected to the wireless base station A; however, more radio resources are allocated, with the result that high throughput can be achieved. For this reason, from the point of view of the throughput of the wireless terminal, there is a possibility that this wireless terminal may achieve higher throughput when connected to the wireless base station B than when connected to the wireless base station A.

Another possible serving base station selecting method is one by which to determine an optimum serving base station in a centralized management manner through cooperation between wireless base stations. However, such a method for selecting a serving base station in a centralized management manner has a problem with an increase in load caused by the cooperation between wireless base stations. For example, choosing a serving base station across the wireless base stations causes an increase in the number of candidates for the serving base station, thus complicating the selection algorithm. Further, the necessity for the adjacent wireless base stations to share information regarding received power or information regarding throughput at each wireless terminal causes an increase in the amount of information that the wireless base stations communicate to each other.

On the other hand, "Proportional Fair-Based Joint Optimization of Cell Association and Inter-cell Interference Coordination for Heterogeneous Networks", *IEICE technical report: Shingakugiho*, RCS2013-304 (2014-1) (hereinafter referred to as "NPL 1") discloses a technique for selecting a serving base station in an autonomous distributed manner for each wireless base station without using cooperation between wireless base stations.

According to NFL 1, a wireless terminal sequentially changes from one serving base station to another for each wireless base station so that the sum of logarithms of throughput of all wireless terminals reaches its maximum. In so doing, the wireless terminal selects candidates for the wireless base station to which the wireless terminal is connected.

The index that NFL 1 uses as a criterion for selecting a serving base station is throughput (expected throughput) that is expected after a change of the serving base station. The estimation of this expected throughput requires information regarding a bandwidth that a wireless base station that serves as a serving base station after the change allocates to this wireless terminal and information regarding the reception quality of this wireless base station. The information regarding the bandwidth that is allocated to the wireless terminal can be acquired by the wireless base station notifying the wireless terminal of the information. Further, the information regarding the reception quality of the wireless base station can be acquired by this wireless terminal measuring the reception quality of an adjacent base station.

According to NPL 1, for example, the average bandwidth $w_n$, which is allocated to each wireless terminal after the serving base station has been changed to a wireless base station n, can be calculated by equation (1):

$$W_n(t) = \frac{W_n}{K_n(t) + 1} \quad (1)$$

Note here that $W_n$ represents the system bandwidth of the wireless base station n and $K_n(t)$ represents the number of wireless terminals that are connected to the wireless base station n at a point in time t.

In the aforementioned heterogeneous network configuration, flexibility of the allocation of radio resources by a wireless base station is required in response to diversification of mobile communication situations such as situations of arrangement of wireless base stations, changes in radio traffic load to be accommodated, and provision of various services. However, it has conventionally been impossible to select an optimum serving base station in accordance with a radio resource allocation policy (hereinafter simply referred to as "allocation policy") in reaction to such situations. This makes it impossible to maximize the throughput of the whole system.

SUMMARY

One non-limiting and exemplary embodiment provides a wireless base station, a wireless terminal, and a communication control method that make it possible to maximize the throughput of the whole system in consideration of flexible allocation of radio resources.

In one general aspect, the techniques disclosed here feature a wireless base station including: a transmitter that transmits first information indicating an allocation policy that determines system performance and second information regarding an allocated bandwidth that is allocated to a wireless terminal in a case where the allocation policy is applied; a receiver that receives, from each of a plurality of the wireless terminals, third information regarding a serving base station candidate and throughput that is achieved in a case where the wireless terminal is connected to the serving base station candidate, the serving base station candidate being a wireless base station for which the greatest throughput is calculated from the allocated bandwidth calculated using the first information, the second information, and reception quality; and circuitry that controls, on the basis of the third information, a connection to a wireless terminal having the greatest throughput.

An aspect of the present disclosure makes it possible to maximize the throughput of the whole system in consideration of flexible allocation of radio resources.

It should be noted that general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 shows an example of a serving base station switching method according to Embodiment 3.

DETAILED DESCRIPTION

Figure 1:
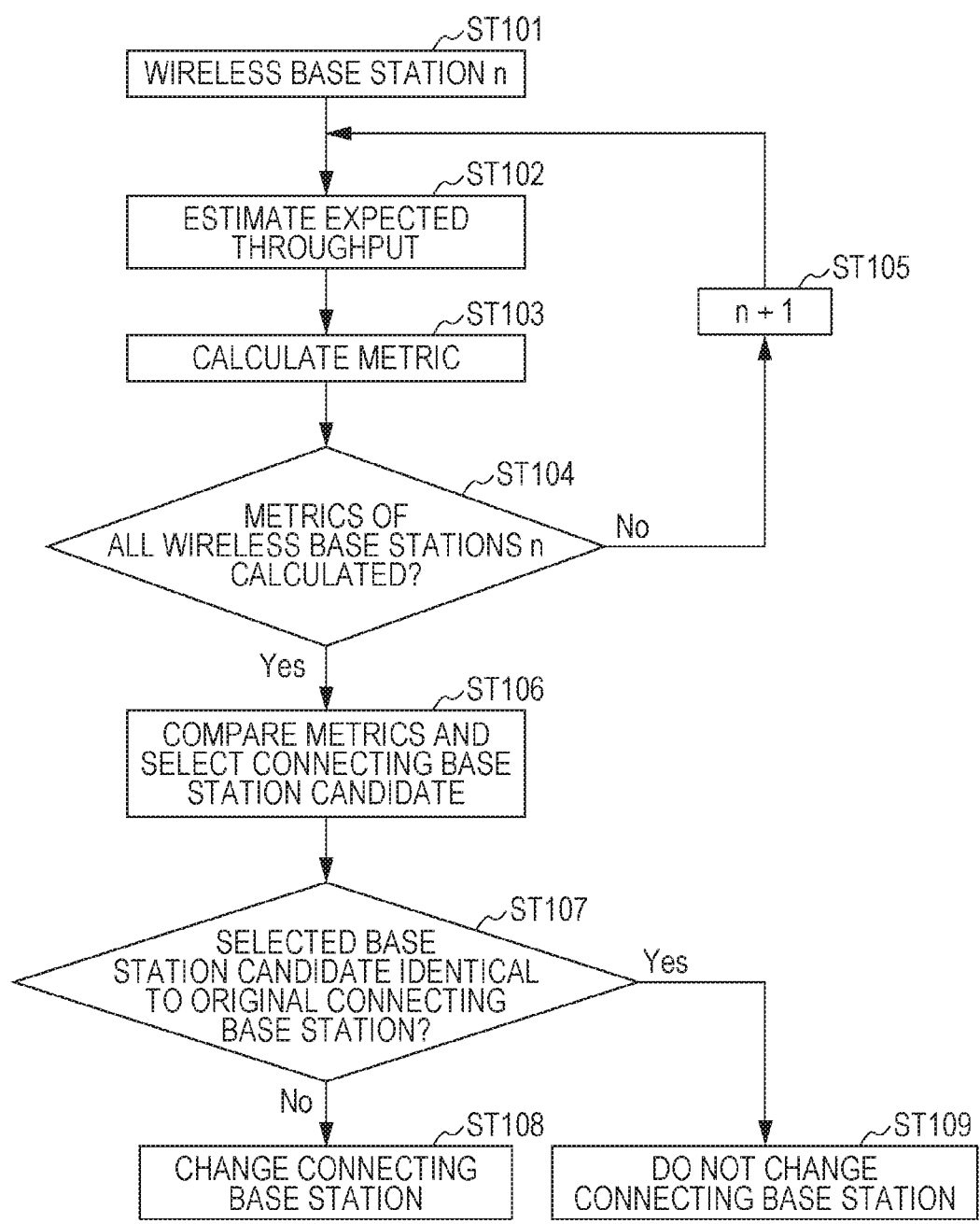
FIG. 1 shows an example of a serving base station selecting method.

In the following, embodiments of the present disclosure are described in detail with reference to the drawings.
Serving Base Station Selecting Method
First, a serving base station selecting method according to the present disclosure is described.

A wireless base station n and a wireless terminal k that is connected to the wireless base station n are discussed here.

First, the average throughput $R_k(t)$ of the wireless terminal k at a point in time t is expressed by equation (2):

$$R_k(t) = R_k(t-1) + \frac{1}{T_{avg}} \left[ \sum_{n=1}^{N} b_{k,n}(t) w_{k,n}(t) r_{k,n} - R_k(t-1) \right] \quad (2)$$

Note here that $b_{k,n}(t)$ is a variable that shows whether the wireless terminal k is connected to the wireless base station n at the point in time t. If the wireless terminal k is connected to the wireless base station n at the point in time t, $b_{k,n}(t)=1$, and if the wireless terminal k is not connected to the wireless base station n at the point in time t, $b_{k,n}(t)=0$. Further, $w_{k,n}(t)$ represents an allocated bandwidth that is allocated to the wireless terminal k when the wireless terminal k is connected to the wireless base station n at the point in time t. $r_{k,n}$ represents frequency usage efficiency (which is equivalent to reception quality) that is achieved when the wireless terminal k is connected to the wireless base station n. Further, $T_{avg}$ represents throughput averaging time.

The throughput (system throughput) U(t) of the whole system in a wireless base station can be generalized by equation (3) according to "Fair end-to-end window-based congestion control", IEEE/ACM Trans. Networking, vol. 8, no. 5, pp. 556-567, October 2000 (hereinafter referred to as "NFL 2"):

$$U(t) = \begin{cases} \sum_{k=1}^{K} p_k \log R_k(t), & \alpha = 1 \\ \sum_{k=1}^{K} p_k \frac{R_k(t)^{1-\alpha}}{1-\alpha}, & \alpha \geq 0, \alpha \neq 1 \end{cases} \quad (3)$$

Note here that $p_k$ represents the weighting of priority that is set for each wireless terminal k. Further, $\alpha$ represents a parameter that controls a method by which a scheduler of the wireless base station allocates radio resources to wireless terminals.

For example, $\alpha=0$ corresponds to a method for allocating resources to wireless terminals so that the arithmetic mean of user throughput reaches its maximum. This is equivalent to the Max CIR scheduling method, by which resources are preferentially allocated to wireless terminals having high user throughput.

$\alpha=1$ corresponds to a method for allocating resources to wireless terminals so that the geometric mean of user throughput reaches its maximum. This is equivalent to proportional fairness (PF) scheduling.

$\alpha=2$ corresponds to a method for allocating resources to wireless terminals so that the harmonic mean of user throughput reaches its maximum.

$\alpha=\infty$ corresponds to a method for allocating resources to wireless terminals in equal proportions regardless of magnitude of user throughput. This is equivalent to round-robin scheduling.

That is, this parameter $\alpha$ is equivalent to an allocation policy in the wireless base station.

Moreover, by allocating radio resources to wireless terminals so that U(t) represented by equation (3) reaches it maximum, the wireless base station allocates the radio resources while taking into account the allocation policy corresponding to the parameter α thus set.

Note here that the system throughput U(t) represented by equation (3) can be maximized simply by substituting $R_k(t)$ represented by equation (2) into equation (3) and calculating the serving wireless base station $b_{k,n}(t)$ and allocated bandwidth $w_{k,n}(t)$ at which U(t) is at the maximum. This is a convex optimization regarding U(t). If there is an increase by at least a difference ΔU of the system throughput U(t) in a case where there is a change in the serving wireless base station and the allocated frequency (allocated bandwidth) during passage of time from a point in time t−1 to the point in time t, it means that the change comes closer to a state where U(t) is at the maximum. Accordingly, with use of a Taylor expansion, the difference ΔU of the system throughput U(t) is expressed by equation (4):

$$\Delta U = U(t) - U(t-1) = \qquad (4)$$
$$\frac{1}{T_{avg}} \sum_{k=1}^{K} \frac{p_k}{R_k(t-1)^\alpha} \left[ \sum_{n=1}^{N} b_{k,n}(t) w_{k,n}(t) r_{k,n} - R_k(t-1) \right] + O\left(\frac{1}{T_{avg}^2}\right)$$

If $T_{avg}$ is sufficiently larger than the passage of time, ΔU can be maximized simply by calculating the serving wireless base station $b_{k,n}(t)$ and allocated bandwidth $w_{k,n}(t)$ at which G(t) represented by equation (5) below is maximized.

$$G(t) = \sum_{k=1}^{K} \frac{p_k}{R_k(t-1)^\alpha} \left[ \sum_{n=1}^{N} b_{k,n}(t) w_{k,n}(t) r_{k,n} - R_k(t-1) \right] \qquad (5)$$

For the optimization of G(t) represented by equation (5), thought is given to sequential calculation by distributed processing without cooperation between wireless base stations.

Assuming that $K_n(t)$ is a group of wireless terminals that are connected to the wireless base station n at the point in time t, the following discusses the allocation of radio resources to a wireless terminal $k \in K_n(t)$ by the wireless base station n. That is, the allocated bandwidth $w_{k,n}(t)$ that is allocated in a case where the serving wireless base station $b_{k,n}(t)$ is fixed is calculated.

According to NPL 2, the optimum radio resource allocation is expressed by equation (6):

$$\{w^*_{k,n}(t) | k \in K_n(t)\} = \qquad (6)$$
$$\arg \max_{\{w_{k,n}(t)\}, k \in K_n(t)} U(\{w_{k,n}(t)\}) = \sum_{k \in K_n(t)} p_k \frac{(w_{k,n}(t) r_{k,n})^{1-\alpha}}{1-\alpha}$$

Note, however, that equation (6) satisfies a condition shown in equation (7):

$$w_{k,n}(t) \geq 0, \sum_{k=1}^{K} w_{k,n}(t) = W_n \qquad (7)$$

This makes a convex optimization problem. Accordingly, the Lagrangian function is defined by equation (8):

$$L = U - \sum_{k \in K_n(t)} \lambda_k(-w_{k,n}(t)) - \mu\left(\sum_{k \in K_n(t)} w_{k,n}(t) - W_n\right) = \qquad (8)$$
$$\sum_{k \in K_n(t)} p_k \frac{(w_{k,n}(t) r_{k,n})^{1-\alpha}}{1-\alpha} + \sum_{k \in K_n(t)} \lambda_k w_{k,n}(t) - \mu\left(\sum_{k \in K_n(t)} w_{k,n}(t) - W_n\right)$$

Further, at this point in time, the KKT (Karush-Kuhn-Tucker) condition is expressed by equation (9):

$$\begin{cases} \frac{\partial L}{\partial w_{k,n}} = p_k r_{k,n}^{1-\alpha} w_{k,n}(t)^{-\alpha} + \lambda_k - \mu \\ w_{k,n}(t) \geq 0, \; \lambda_k \geq 0 \; \lambda_k w_{k,n}(t) = 0 \\ \sum_{k \in K_n(t)} w_{k,n}(t) = W_n \end{cases} \qquad (9)$$

Solving this allows the optimum allocated bandwidth $w_{k,n}(t)$ to be expressed by equation (10):

$$w_{k,n}(t) = \frac{p_k^{1/\alpha} r_{k,n}^{1/\alpha - 1}}{\sum_{i \in K_n(t)} p_i^{1/\alpha} r_{i,n}^{1/\alpha - 1}} W_n = \frac{1}{\beta_n(t)} p_k^{1/\alpha} r_{k,n}^{1/\alpha - 1} \qquad (10)$$

Note here that $\beta_n(t)$ is expressed by equation (11):

$$\beta_n(t) = \frac{\sum_{i \in K_n(t)} p_i^{1/\alpha} r_{i,n}^{1/\alpha - 1}}{W_n} \qquad (11)$$

About Optimum Allocated Bandwidth

An optimum allocated bandwidth in a case where an allocation policy is taken into account is described here with reference to equation (10). That is, the allocated bandwidth $w_{k,n}(t)$ represented by equation (10) is described.

It should be noted that, in equation (10), $p_k$ is the weighting of priority to the wireless terminal k, and in a case where equal priority is given to each wireless terminal, $p_k$ takes on the same value for the wireless terminal k. Assuming that equal priority is given to each wireless terminal, the following describes a case where $p_k=1$.

In the first expression in equation (10), the denominator is a combined value of frequency usage efficiency of all wireless terminals i ($\in K_n(t)$) connected to the wireless base station n in a case where the allocation policy α is applied, and the numerator is the frequency usage efficiency of the wireless terminal k in a case where the allocation policy α is applied.

This shows that the optimum allocated bandwidth $w_{k,n}(t)$ to the wireless terminal k is calculated using the proportion of the frequency usage efficiency of the wireless terminal k to the combined value of frequency usage efficiency of all wireless terminals connected to the wireless base station n. Further, the combined value of frequency usage efficiency of all wireless terminals connected to the wireless base station n in a case where the allocation policy α is applied is included in $\beta_n(t)$ (numerator) represented by equation (11).

Further, this shows that the allocated bandwidth $w_{k,n}(t)$ is calculated using the allocation policy α, the combined value of frequency usage efficiency of all wireless terminals connected to the wireless base station n, and the frequency usage efficiency (which is equivalent to reception quality) of the wireless terminal k.

Method for Switching Between Serving Base Stations

In the manner described above, an optimum allocated bandwidth with the allocation policy α taken into account in allocating radio resources to wireless terminals can be calculated. The following describes a serving base station switching method by which a wireless terminal switches from being connected to one wireless base station to being connected to another.

The allocated bandwidth $\tilde{w}_{k,n}(t)$ that is allocated to the wireless terminal k when the wireless terminal k is newly connected to the wireless base station n at the point in time t can be calculated by equation (12):

$$\tilde{w}_{k,n}(t) = \frac{W_n}{W_n \beta_n(t-1) + p_k^{1/\alpha} r_{k,n}^{1/\alpha-1}} p_k^{1/\alpha} r_{k,n}^{1/\alpha-1} \quad (12)$$

Note here that $\beta_n(t-1)$ is information based on wireless terminals connected to the wireless base station n at the point in time t−1, and is expressed by equation (13):

$$\beta_n(t-1) = \frac{1}{W_n} \sum_{i \in K_n(t-1)} p_i^{1/\alpha} r_{i,n}^{1/\alpha-1} \quad (13)$$

Note here that the calculation for the wireless terminal k of the allocated bandwidth $\tilde{w}_{k,n}(t)$ represented by equation (12) requires the information $\beta_n(t-1)$ represented by equation (13) and based on the wireless terminals connected to the wireless base station n.

Accordingly, first, the wireless base station notifies $\beta_n(t-1)$ toward the wireless terminal k. Doing so allows the wireless terminal k to calculate the allocated bandwidth that is allocated to the wireless terminal k when the wireless terminal k is newly connected to the wireless base station n.

Next, the wireless terminal k selects a serving base station from among a plurality of wireless base stations. Specifically, the wireless terminal k calculates metrics regarding each separate wireless base station, compares the metrics thus calculated, and selects a serving base station candidate.

FIG. 1 is a flow chart showing an example of a method for selecting a serving base station candidate using metrics.

First, the wireless terminal k assumes a new connection to the wireless base station n (step (hereinafter denoted as "ST") 101), The wireless terminal k estimates, on the basis of the allocated bandwidth $\tilde{w}_{k,n}(t)$ represented by equation (12), throughput (expected throughput) that the wireless terminal k is expected to achieve when newly connected to the wireless base station n (ST102). In so doing, the wireless terminal k, which has separately measured the reception quality of the wireless base station n, estimates the throughput using the reception quality thus measured.

Next, on the basis of the expected throughput, the wireless terminal k calculates, according to equation (14) below, a metric $\tilde{M}_{k,n}(t)$ at which the wireless terminal k is newly connected to the wireless base station n (ST103).

$$\tilde{M}_{k,n}(t) = p_k \frac{\tilde{w}_{k,n}(t) r_{k,n} - R_k(t-1)}{R_k(t-1)^\alpha} \quad (14)$$

The wireless terminal k performs this metric calculation for all surrounding wireless base stations that can be the serving base station candidate (ST104, ST105).

It should be noted that a wireless base station that provides higher throughput for the wireless terminal k has a greater metric value. That is, by selecting the wireless base station n, for which the greatest metric is calculated, as the serving base station candidate, the wireless terminal k can be connected to a wireless base station that provides higher throughput.

Accordingly, the wireless terminal k compares the respective metrics of the wireless base stations and selects, as the serving base station candidate, a wireless base station having the greatest metric (ST106).

Next, the wireless terminal k determines whether the selected serving base station candidate is the original serving base station (i.e. the wireless base station to which the wireless terminal k is currently connected) (ST107). In a case where the serving base station candidate is not the original serving base station (ST107: No), the wireless terminal k changes the serving base station (ST108). On the other hand, in a case where the serving base station candidate is the original serving base station (ST107: Yes), the wireless terminal k does not change the serving base station (ST109).

In changing the serving base station, the wireless terminal k reports, to the wireless base station n, which is the serving base station candidate, a metric at which the wireless terminal k is newly connected to the wireless base station n (see equation (14)).

The wireless base station n selects a wireless terminal having the greatest metric from among a plurality of wireless terminals that, like the wireless terminal k, have reported the wireless base station n as the serving base station candidate. The wireless base station n permits the selected wireless terminal to be connected.

At this point in time, only one wireless terminal is permitted to be newly connected to the wireless base station n. This is because the allocated bandwidth calculated by equation (12) assumes a case where one wireless terminal is newly connected to the wireless base station n. In this case, simultaneous connection of a plurality of wireless terminals to the wireless base station n makes it impossible to achieve the throughput expected on the side of the wireless terminals. Therefore, a case where there are a plurality of wireless terminals having selected the wireless base station n as the serving base station candidate can be handled by sequentially performing the aforementioned serving base station switching process on the wireless terminals one by one. For this reason, in a case where a wireless terminal has changed from one serving base station to another, information according to the situation after the change, i.e. the information $\beta_n(t-1)$ represented by equation (13) and based on all terminals connected to the wireless base station n, is updated in consideration of the newly-connected wireless terminal.

As described above, the application of the serving base station selecting method makes it possible to, in allocating radio resources while taking an allocation policy of a wireless base station into account, select an optimum serving base station that maximizes system throughput based on the allocation policy.

It should be noted that $\beta_n(t-1)$ represented by equation (13) includes a system bandwidth $W_n$. Note, however, that in a case where the system bandwidth $W_n$ is information that is already known to the wireless terminal, $W_n$ does not need to be included in $\beta_n(t-1)$. Examples of situations where the system bandwidth $W_n$ is information that is already known to the wireless terminal include a case where the system bandwidth $W_n$ is the same for each wireless base station and a case where the wireless base station notifies the wireless terminal of the system bandwidth as information for use in adjacent base station measurement for handover. In this case, the information $\beta_n(t-1)$ represented by equation (13) and based on the terminals connected to the wireless base station n may alternatively be expressed by equation (15):

$$\beta_n(t-1) = \sum_{i \in K_n(t-1)} p_i^{1/\alpha} r_{i,n}^{1/\alpha-1} \quad (15)$$

$\beta_n(t-1)$ represented by equation (15) represents a combined value of frequency usage efficiency taking into account allocation policies in all wireless terminals connected to the wireless base station n.

Embodiment 1

Overview of Communication System

A communication system according to each embodiment of the present disclosure includes, for example, a wireless base station 100 and a wireless terminal 200.

The communication system employs, for example, a heterogeneous network configuration in which small cells are arranged within a macrocell, and the wireless terminal 200 is connected to and performs communication with any of a plurality of the wireless base stations 100 (which correspond to macrocells or small cells).

Further, the wireless base station 100 and the wireless terminal 200 use the aforementioned serving base station selecting method so that a serving base station to which the wireless terminal 200 is connected is selected from among the plurality of wireless base stations 100.

Figure 2:
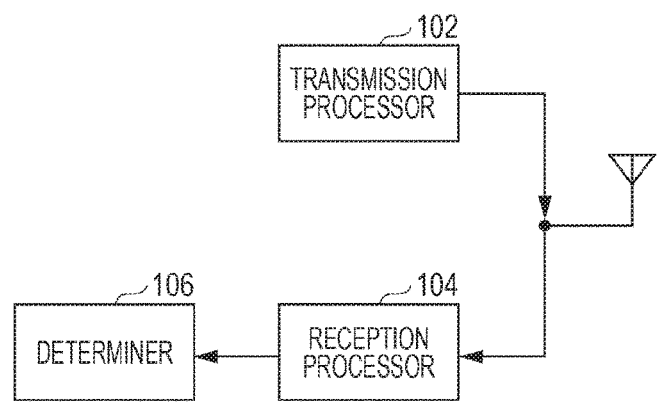
FIG. 2 shows a configuration of the main components of a wireless base station according to Embodiment 1.

FIG. 2 is a block diagram showing the main components of a wireless base station 100 according to an embodiment of the present disclosure. As shown in FIG. 2, the base station 100 includes a transmission processor 102 that transmits first information ($\alpha$) indicating an allocation policy that determines system performance and second information ($\beta$) for calculating an allocated bandwidth that is allocated to a wireless terminal 200 in a case where the wireless terminal 200 is connected to each of a plurality of the wireless base stations 100. The base station 100 also includes a reception processor 104 that receives, from each of a plurality of the wireless terminals 200, third information (metric) regarding a serving base station candidate selected by the wireless terminal 200 and throughput that is achieved by the wireless terminal 200 in a case where the wireless terminal 200 is connected to the serving base station candidate. Note here that the serving base station candidate is a wireless base station 100 for which the greatest throughput is calculated from the allocated bandwidth calculated using the first information, the second information, and reception quality measured by each wireless terminal 200. The base station 100 also includes a determiner 106 which, for each of the plurality of wireless base stations 100, permits, on the basis of the third information (metrics), a wireless terminal 200 having the greatest throughput of wireless terminals 200 having selected the wireless base station 100 as the serving base station candidate to be connected to the wireless base station 100.

Figure 3:
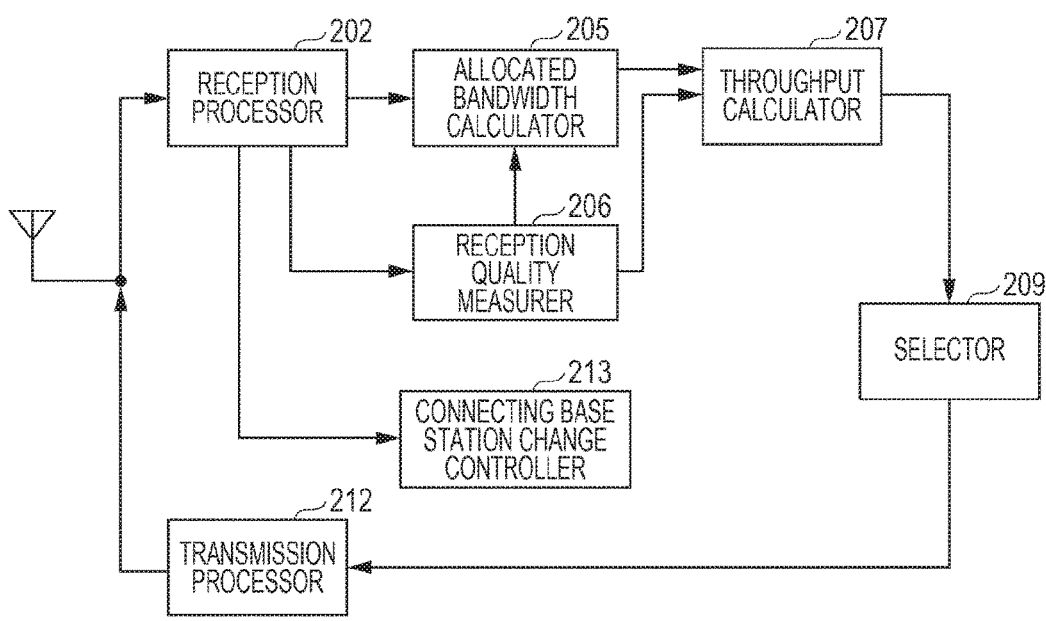
FIG. 3 shows a configuration of the main components of a wireless terminal according to Embodiment 1.

Further, FIG. 3 is a block diagram showing the main components of a terminal 200 according to an embodiment of the present disclosure. As shown in FIG. 3, the terminal 200 includes a reception processor 202 that receives first information ($\alpha$) indicating an allocation policy that determines system performance and second information ($\beta$) for calculating an allocated bandwidth that is allocated to the wireless terminal 200 in a case where the wireless terminal 200 is connected to each of a plurality of wireless base stations 100. The terminal 200 also includes a reception quality measurer 206 that measures reception quality with respect to each of the plurality of wireless base stations 100. The terminal 200 also includes an allocated bandwidth calculator 205 that calculates the allocated bandwidth for each of the plurality of wireless base stations 100 using the first information, the second information, and the reception quality. The terminal 200 also includes a throughput calculator 207 that calculates, using the allocated bandwidth and the reception quality, throughput that is achieved in a case where the wireless terminal 200 is connected to each of the plurality of wireless base stations 100. The terminal 200 also includes a selector 209 that selects a wireless base station 100 for which the greatest throughput has been calculated as a serving base station candidate from among the plurality of wireless base stations 100. The terminal 200 also includes a transmission processor 212 that transmits third information (metric) regarding the serving base station candidate and the throughput corresponding to the serving base station candidate. The terminal 200 also includes a serving base station change controller 213 that controls connection switching of wireless base stations 100 in accordance with an instruction to connect to the serving base station candidate.

Configuration of Wireless Base Station

Figure 4:
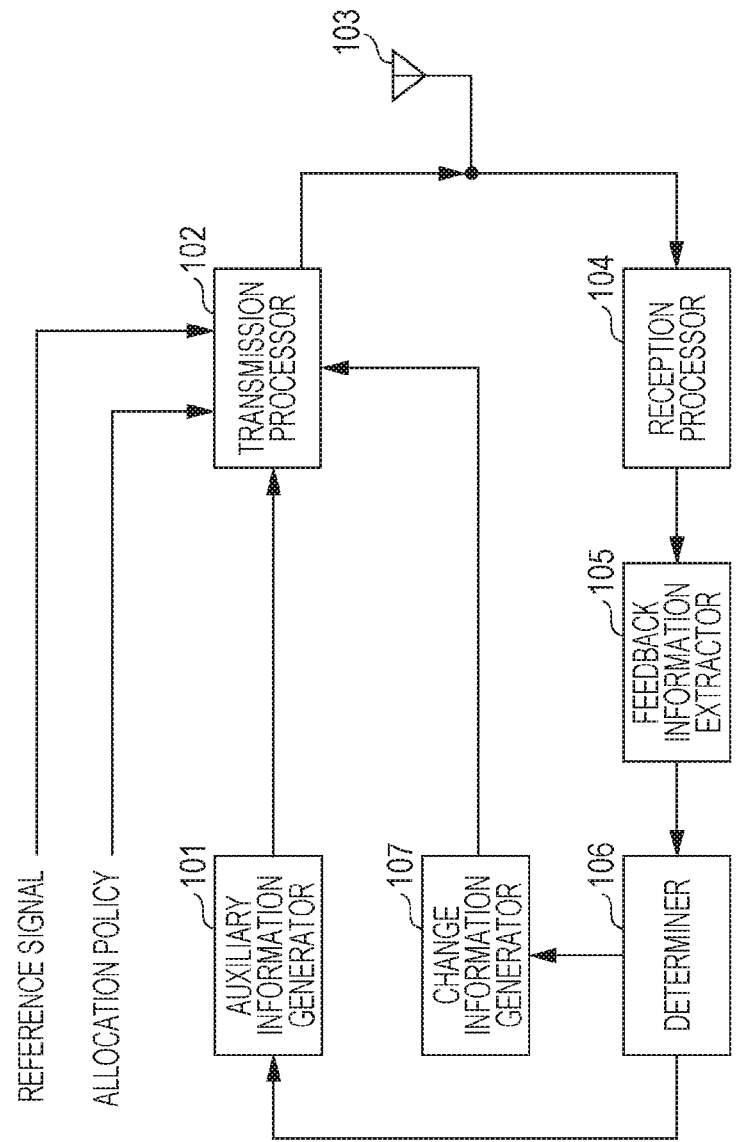
FIG. 4 shows a configuration of a wireless base station according to Embodiment 1.

FIG. 4 is a block diagram showing a configuration of a wireless base station 100 according to Embodiment 1. As shown in FIG. 4, the wireless base station 100 includes an auxiliary information generator 101, a transmission processor 102, an antenna 103, a reception processor 104, a feedback information extractor 105, a determiner 106, and a change information generator 107.

The auxiliary information generator 101 generates auxiliary information ($\beta$) that is needed to calculate an allocated bandwidth that is allocated to a wireless terminal 200 in a case where the wireless terminal 200 is newly connected to the wireless base station 100 to which an allocation policy is applied. The auxiliary information generator 101 outputs the auxiliary information thus generated to the transmission processor 102. It should be noted an example of the auxiliary information is $\beta_n(t-1)$ represented by equation (13) or (15).

Further, in a case of having been notified by the after-mentioned determiner 106 that the wireless base station 100 changes from connecting to first wireless terminals 200 to connecting to second wireless terminals 200, the auxiliary information generator 101 updates, on the basis of the second wireless terminals 200, the auxiliary information ($\beta$) that is needed for the wireless terminal 200 to calculate an allocated bandwidth, thereby reflecting the change from connecting to the first wireless terminal 200 to connecting to the second wireless terminals 200.

The transmission processor 102 receives a reference signal, information indicating an allocation policy, auxiliary information that is outputted from the auxiliary information generator 101, or change information that is outputted from the after-mentioned change information generator 107.

The term "reference signal" here refers to a signal that is used by a wireless terminal 200 to measure a line between the wireless terminal 200 and the wireless base station 100. This signal is a signal (known signal) whose sequence, position, and timing are shared by both the wireless base station 100 and the wireless terminal 200.

Further, the allocation policy is information (α), applied to a communication system including the wireless base station 100, which indicates an allocation policy of radio resources to wireless terminals 200. That is, the allocation policy is information that determines system performance.

The transmission processor 102 generates transmit data containing an allocation policy, auxiliary information, or change information in accordance with a predetermined format and generates a transmitted signal by performing transmission processes such as an encoding process and a modulation process on the transmit data thus generated. Further, the transmitted signal may contain, for example, control information regarding a physical layer, a control signal that is notified in a higher layer than the physical layer, or the like.

The antenna 103 transmits a transmitted signal generated by the transmission processor 102 toward a wireless terminal 200. Further, the antenna 103 receives a signal transmitted from a wireless terminal 200.

The reception processor 104 generates receive data by performing reception processes such as a demodulation process and a decoding process on the received signal received by the antenna 103.

The feedback information extractor 105 extracts, from receive data generated by the reception processor 104, feedback information fed back from a wireless terminal 200. Feedback information fed back from each wireless terminal 200 contains information regarding a serving base station candidate selected by the wireless terminal 200 and expected throughput that is expected to be achieved by the wireless terminal 200 in a case where the wireless terminal 200 is connected to the serving base station candidate. An example of the information regarding expected throughput is the metric represented by equation (14). It should be noted that the higher the expected throughput is, the greater value the metric takes on.

The determiner 106 determines, on the basis of feedback information extracted by the feedback information extractor 105, a wireless terminal 200 to be connected to the wireless base station 100. For example, the determiner 106 determines, as the wireless terminal to be connected, that one of the wireless terminals 200 having transmitted feedback information which reports the greatest metric. That is, the determiner 106 permits, on the basis of the metrics, a wireless terminal 200 having the greatest expected throughput of wireless terminals 200 having selected the wireless base station 100 as the serving base station candidate to be connected to the wireless base station 100. Further, in a case where, as a result of the determination, there has occurred a change of the wireless terminal to be connected to the wireless base station 100, the determiner 106 outputs information indicating the occurrence of the change to the auxiliary information generator 101 and the change information generator 107.

Upon receiving, from the determiner 106, information indicating that the wireless base station 100 changes from a first wireless terminal 200 to a second wireless terminal 200, the change information generator 107 generates information (change information) indicating to the second wireless terminal 200 (e.g. the wireless terminal 200 permitted to be connected) that there will be a change (i.e. a handover) of the serving base station. As with other information, the change information thus generated is inputted to the transmission processor 102 and subjected to transmission processes.

Configuration of Wireless Terminal

Figure 5:
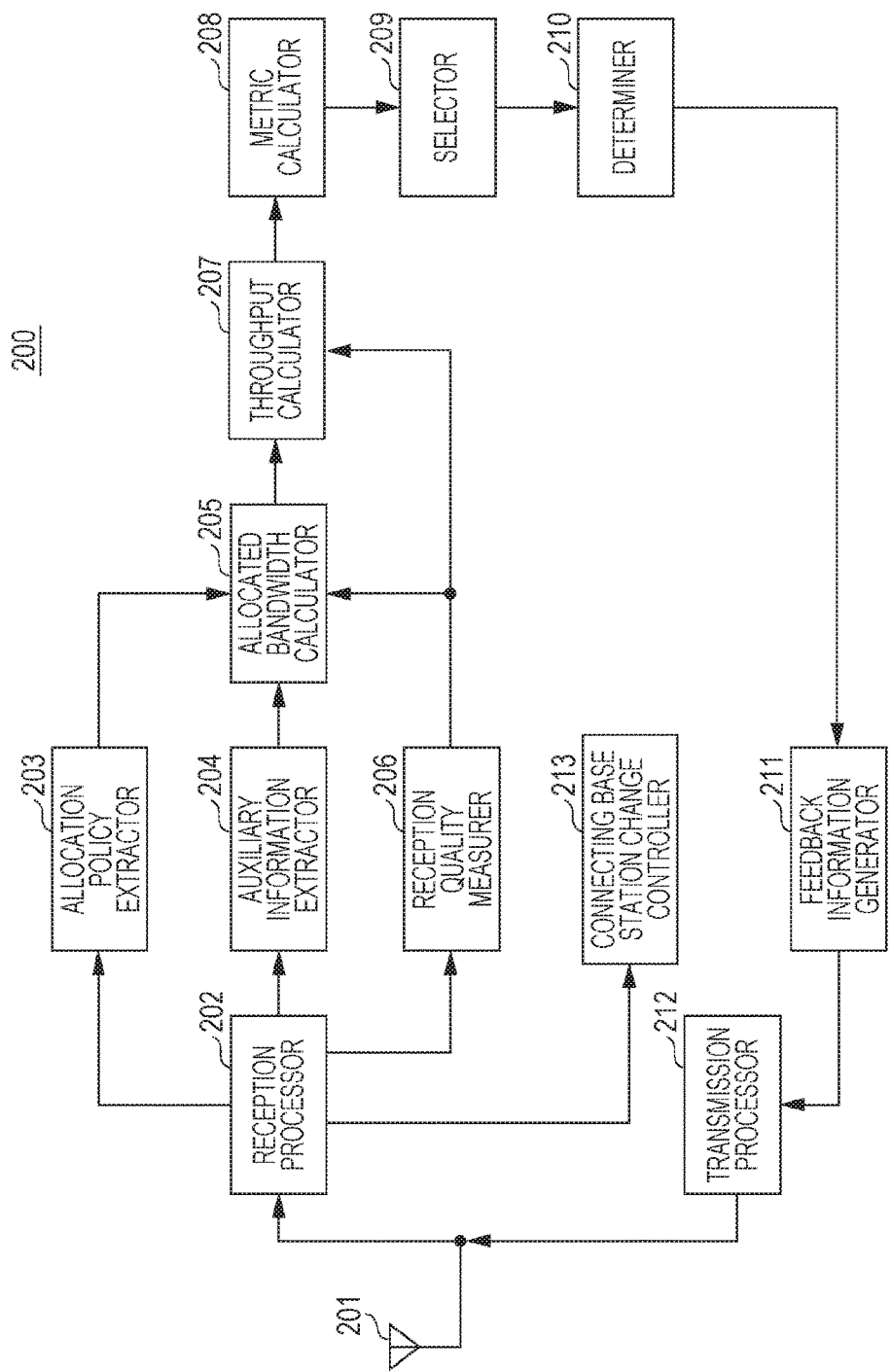
FIG. 5 shows a configuration of a wireless terminal according to Embodiment 1.

FIG. 5 is a block diagram showing a configuration of a wireless terminal 200 according to Embodiment 1. As shown in FIG. 5, the wireless terminal 200 includes an antenna 201, a reception processor 202, an allocation policy extractor 203, an auxiliary information extractor 204, an allocated bandwidth calculator 205, a reception quality measurer 206, a throughput calculator 207, a metric calculator 208, a selector 209, a determiner 210, a feedback information generator 211, a transmission processor 212, and a serving base station change controller 213.

The antenna 201 receives a signal transmitted from a wireless base station 100 and outputs the received signal to the reception processor 202. Further, the antenna 201 transmits, toward a wireless base station 100, a transmitted signal that is outputted from the transmission processor 212.

The reception processor 202 generates receive data by performing reception processes such as a demodulation process and a decoding process on a received signal received by the antenna 201. The reception processor 202 outputs the receive data thus generated to the allocation policy extractor 203, the auxiliary information extractor 204, the reception quality measurer 206, and the serving base station change controller 213.

The allocation policy extractor 203 extracts, from receive data that is outputted from the reception processor 202, allocation policy (α) indicating information notified from a wireless base station 100 and outputs the allocation policy indicating information thus extracted to the allocated bandwidth calculator 205.

The auxiliary information extractor 204 extracts, from receive data that is outputted from the reception processor 202, auxiliary information (β) notified from a wireless base station 100 and outputs the auxiliary information thus extracted to the allocated bandwidth calculator 205. It should be noted that such auxiliary information is obtained for each of a plurality of wireless base stations 100 that can be a serving base station candidate.

The allocated bandwidth calculator 205 calculates, on the basis of an allocation policy that is outputted from the allocation policy extractor 203, auxiliary information that is outputted from the auxiliary information extractor 204, and reception quality that is outputted from the reception quality measurer 206, an allocated bandwidth that is allocated to the wireless terminal 200 in a case where the wireless terminal 200 is connected to each of the plurality of wireless base stations 100 that can be the serving base station candidate. The allocated bandwidth calculator 205 outputs information indicating the allocated bandwidth thus calculated to the throughput calculator 207.

The reception quality measurer 206 measures reception quality between a wireless base station 100 and the wireless terminal 200 with reference to a reference signal transmitted from a wireless base station 100 and contained in receive data that is outputted from the reception processor 202. Examples of the reception quality include RSRP, RSRQ (Reference Signal Received Quality), and the like.

With reference to an allocated bandwidth that is outputted from the allocated bandwidth calculator 205 and reception quality that is outputted from the reception quality measurer 206, the throughput calculator 207 calculates expected throughput that is expected to be achieved by the wireless terminal 200 in a case where the wireless terminal 200 is newly connected to each of the plurality of wireless base stations 100 that can be the serving base station candidate. The throughput calculator 207 outputs the expected throughput thus calculated to the metric calculator 208.

On the basis of expected throughput that is outputted from the throughput calculator 207, the metric calculator 208 calculates a metric (information regarding expected throughput) for each of the plurality of wireless base stations 100 that can be the serving base station candidate. The metric calculator 208 calculates a metric for each of the plurality of wireless base stations 100 that can be the serving base station candidate.

The selector 209 selects a wireless base station 100 having the greatest metric as the serving base station candidate from among the plurality of wireless base stations 100 on the basis of metrics that are outputted from the metric calculator 208. That is, the serving base station candidate is a wireless base station 100 for which the greatest expected throughput is calculated from the allocated bandwidth calculated using the allocation policy ($\alpha$), the auxiliary information ($\beta$), and reception quality measured by each wireless terminal 200.

The determiner 210 determines whether a serving base station candidate selected by the selector 209 is identical to the serving base station to which the wireless terminal 200 has originally been connected (i.e. the wireless base station 100 to which the wireless terminal 200 is currently connected). Moreover, in a case where the selected serving base station candidate is identical to the serving base station to which the wireless terminal 200 has originally been connected, the determiner 210 determines to continue communication with the serving base station without changing the serving base station. On the other hand, in a case where the selected serving base station candidate is different from the serving base station to which the wireless terminal 200 has originally been connected, the determiner 210 determines to change the serving base station, In a case of having determined to change the serving base station, the determiner 210 outputs the selected serving base station candidate and a metric regarding the serving base station candidate to the feedback information generator 211.

The feedback information generator 211 generates feedback information containing a serving base station candidate and a metric that are outputted from the determiner 210 and outputs the feedback information thus generated to the transmission processor 212.

The transmission processor 212 generates transmit data in accordance with a predetermined format with reference to feedback information that is outputted from the feedback information generator 211 and generates a transmitted signal by performing transmission processes such as an encoding process and a modulation process on the transmit data thus generated.

The serving base station change controller 213 controls connection switching of wireless base stations 100 in accordance with an instruction from a wireless base station 100 to connect to the serving base station candidate. Specifically, in response to an instruction from a wireless base station 100 for the wireless terminal 200 to change the serving base station, the serving base station change controller 213 extracts change information from receive data that is outputted from the reception processor 202 and controls a change of the serving base station in accordance with an instruction indicated by the change information.

Operation of Wireless Base Station 100 and Wireless Terminal 200

The following details a serving base station selecting method that is used by a wireless base station 100 thus configured and a wireless terminal 200 thus configured.

As mentioned above, the wireless base station 100 notifies the wireless terminal 200 of an allocation policy ($\alpha$) of radio resources by the wireless base station 100. Further, the wireless base station 100 notifies, as auxiliary information ($\beta$), a combined value of frequency usage efficiency of all wireless terminals 200 connected to the wireless base station 100 in a case where the allocation policy $\alpha$ is applied.

Meanwhile, the wireless terminal 200 calculates, using the allocation policy thus notified, the auxiliary information thus notified, and reception quality measured by the wireless terminal 200, an allocated bandwidth that is allocated in a case where the wireless terminal 200 is connected to each of a plurality of the wireless base stations 100 and selects, as a serving base station candidate, a wireless base station 100 for which the greatest expected throughput is calculated from the allocated bandwidth thus calculated, The following describes an example of a specific method for realizing the aforementioned serving base station selecting method.

Figure 6:
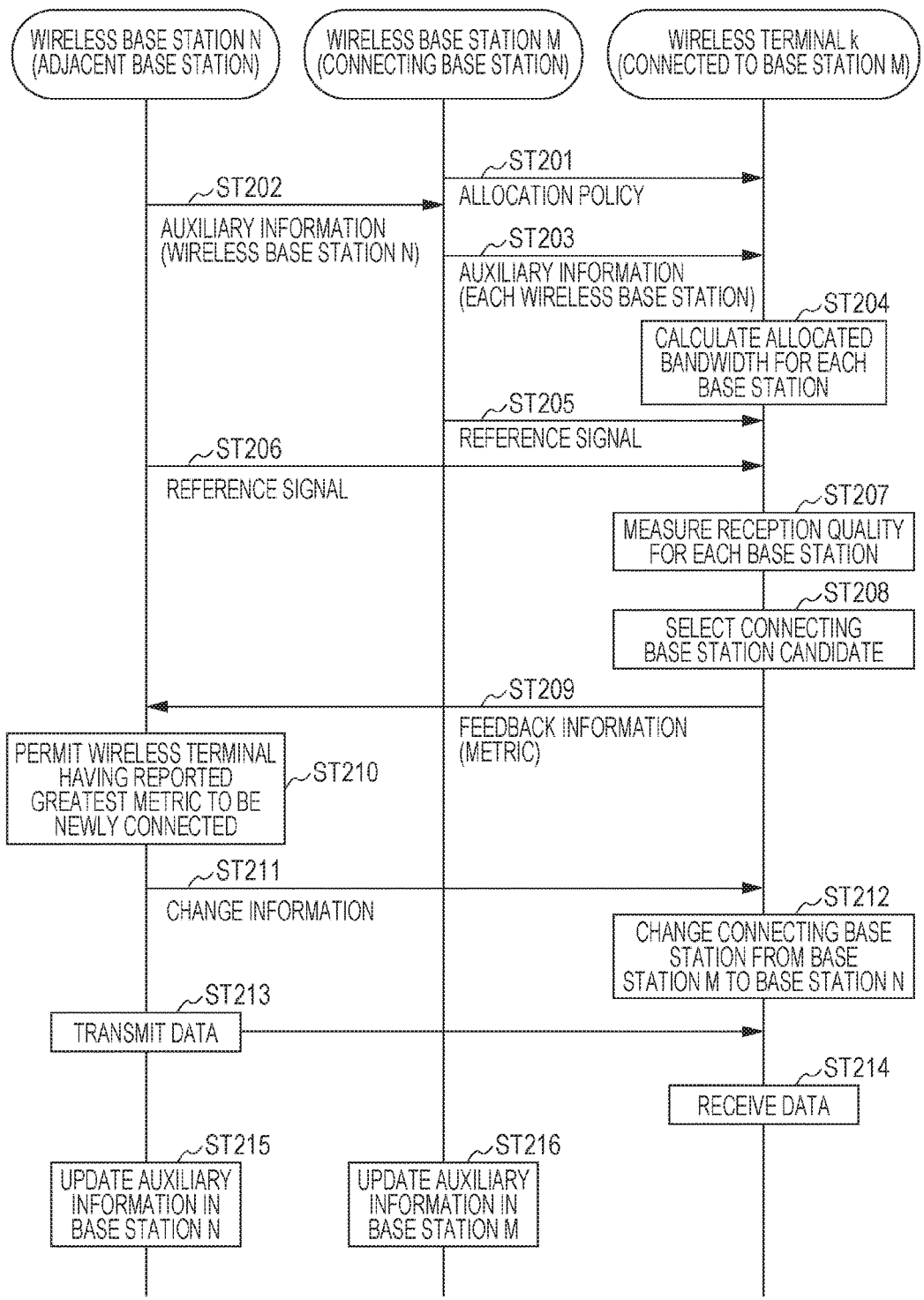
FIG. 6 shows an example of a serving base station switching method according to Embodiment 1.

FIG. 6 is a flow chart showing a procedure that wireless base stations 100 and a wireless terminal 200 perform in an example of a serving base station selecting method.

It should be noted that a wireless terminal k (wireless terminal 200) is connected to a wireless base station M (wireless base station 100) before the process shown in FIG. 6. It is also assumed that a wireless base station N (wireless base station 100) is adjacent to the wireless base station M. That is, to the wireless terminal k, the wireless base station M is a serving base station, and the wireless base station N is an adjacent base station.

FIG. 6 describes a procedure by which the wireless terminal k switches the serving base station from the wireless base station M to the wireless base station N.

In ST201, the wireless base station M, which is the serving base station, broadcasts, to wireless terminals 200 (including the wireless terminal k) surrounding the wireless base station M, an allocation policy that is applied to the wireless base station M.

Note here that the allocation policy is equivalent to the parameter a described in Embodiment 1.

An example of a method for broadcasting an allocation policy is a method for notifying an allocation policy through broadcast information that is transmitted from a wireless base station 100, In an LTE system, another example is a method for notifying an allocation policy through system information (system information blocks: SIB). Still another example may be a method for individually notifying wireless terminals 200 of an allocation policy, In an LTE system, still another example is a method for notification through RRC (radio resource control) signaling, Further, examples of methods for notifying the allocation policy $\alpha$ include a method for directly notifying a value of $\alpha$ per se, a method for setting plural values of $\alpha$ in advance and notifying instruction information associated with the values of $\alpha$ thus set, and the like.

Further, the following are examples of situations where the allocation policy may be changed.

An example is a case where there is a change in traffic in a wireless base station 100. Another possible example is to change the allocation policy (e.g. increase the value of $\alpha$) so as to fairly allocate radio resources in the case of an increase in the number of wireless terminals 200 that are connected to the wireless base station 100.

Still another example is to make the allocation policy become different for each separate wireless base station 100. For example, the allocation policy may be changed for each wireless base station 100 in different situations, for example, by giving priority to fairness (increasing the value of $\alpha$) in the case of a wireless base station 100 of a macrocell covering a wide area or by giving priority to high transmission efficiency (decreasing the value of α) in the case of a wireless base station 100 of a small cell located in an area of traffic concentration.

In ST202, the wireless base station N notifies the wireless base station M (i.e. the base station to which the wireless terminal k is connected) of auxiliary information for calculating an allocated bandwidth in the wireless base station N. The auxiliary information in the wireless base station N is information that is needed to calculate the allocated bandwidth that the wireless base station N allocates to the wireless terminal k in a case where the wireless terminal k is newly connected to the wireless base station N. For example, the auxiliary information is equivalent to equation (13) or (15).

It should be noted the wireless base station M is notified of auxiliary information for each wireless base station from wireless base stations other than the wireless base station N (i.e. wireless base stations that can be the serving base station candidate).

In ST203, the wireless base station M notifies the wireless terminal k of auxiliary information regarding wireless base stations 100 surrounding the wireless terminal k, including the auxiliary information notified from the plurality of wireless base stations (including the wireless base station N) in ST202 and auxiliary information in the wireless base station M.

In so doing, the auxiliary information may be notified through SIB or RRC signaling as with the allocation policy that is notified in ST201. In a case where the wireless terminal k is individually notified, the auxiliary information may be notified through L1/L2 signaling in addition to the aforementioned RRC signaling.

In ST204, the wireless terminal k calculates an allocated bandwidth for each wireless base station 100 using the allocation policy notified from the wireless base station M, which is the serving base station, in ST201 and the auxiliary information in each of the surrounding wireless base stations 100 as notified from the wireless base station M in ST203. The wireless terminal k calculates, for example, the allocated bandwidth ($w\sim_{k,n}$) of the wireless base station n according to equation (12).

As represented by equation (12), the wireless terminal k calculates an allocated bandwidth to the wireless terminal k by each wireless base station 100 using the proportion of frequency usage efficiency of the wireless terminal k to the total of a combined value of frequency usage efficiency of all wireless terminals 200 connected to the wireless base station 100 in a case where the allocation policy α is applied and the frequency usage efficiency of the wireless terminal k.

In ST205, the wireless base station M transmits a reference signal, and in ST206, the wireless base station N transmits a reference signal. It should be noted that the surrounding wireless base stations 100 other than the wireless base stations M and N also transmit reference signals.

In ST207, the wireless terminal k measures reception quality regarding the wireless base station M and reception quality regarding the wireless base station N with reference to the reference signals respectively transmitted from the wireless base stations M and N in ST205 and ST206. It should be noted that the wireless terminal k also measures reception quality with reference to the reference signals transmitted from the surrounding wireless base stations 100 other than the wireless base stations M and N.

It is preferable that the reception quality of each wireless base station 100 be reception quality averaged over time and frequency. Examples of reception quality to be measured include a desired signal-to-noise power ratio (SNR), a desired signal-to-interference power ratio (SIR), a desired signal-to-interference plus noise power ratio (SINR), and the like.

The wireless terminal k calculates, for example, $r_{k,n}$ included in equations (12) and (14) from the reception quality of the wireless base station n thus measured.

It should be noted that the timing of transmission of a reference signal that is transmitted from each wireless base station 100 and the timing of measurement of reception quality by the wireless terminal 200 are not limited to the order of the procedure shown in FIG. 6. For example, reference signals from each wireless base station 100 may alternatively be transmitted at regular intervals or at timings shared by both the wireless base station 100 and the wireless terminal 200. The wireless terminal 200 needs only measure reception quality at the timing of measurement of these reference signals. More specific examples of reference signals in an LTE system include cell-specific reference signals (CRSs) that are transmitted at regular intervals and channel station information reference signals (CSI-RSs) that are transmitted at timings shared by both the wireless base station 100 and the wireless terminal 200.

In ST208, the wireless terminal k calculates, on the basis of the allocated bandwidth (which is equivalent to $w\sim_{k,n}$) by each wireless base station 100 as calculated in ST204 and the reception quality (which is equivalent to $r_{k,n}$) regarding each wireless base station 100 as measured in ST207, expected throughput that is expected to be achieved by the wireless terminal k in a case where the wireless terminal k is connected to each wireless base station 100. Further, in ST208, the wireless terminal k calculates a metric for each wireless base station 100 using the expected throughput thus calculated. The metric is equivalent, for example, to equation (14).

Further, in ST208, the wireless terminal k selects a serving base station candidate on the basis of the metric for each wireless base station 100. An example of a serving base station selecting method is the method shown in FIG. 1. That is, the wireless terminal k selects, as the serving base station candidate, a wireless base station 100 having the greatest metric of the metrics thus calculated. It should be noted that, in FIG. 6, the wireless terminal k selects the wireless base station N as the serving base station candidate.

Further, in ST208, the wireless terminal k determines whether the selected serving base station candidate is identical to the current serving base station. In FIG. 6, the wireless terminal k determines that the wireless base station N, which is the selected serving base station candidate, is different from the wireless base station M, to which the wireless terminal k is currently connected.

In a case where the wireless terminal k has judged in ST208 that the serving base station candidate is different from the serving base station, the wireless terminal k reports feedback information containing the metric regarding the selected serving base station candidate to the serving base station candidate in ST209. In FIG. 6, since the wireless base station N is selected as the serving base station candidate, the wireless terminal k reports the metric regarding the wireless base station N to the wireless base station N.

It should be noted that while FIG. 6 shows a case where the wireless terminal k reports a metric directly to the wireless base station N, this does not imply any limitation. For example, the wireless terminal k may report a metric regarding the wireless base station N, which is the serving base station candidate, to the wireless base station M, which is the serving base station, and the wireless base station M may notify the wireless base station N of the metric received from the wireless terminal k.

In ST210, in a case where other wireless terminals 200 (not illustrated) have selected the wireless base station N as the serving base station candidate, the wireless base station N also receives metrics from these wireless terminals 200 in a manner which is similar to that in which the wireless base station N receives a metric from the wireless terminal k in ST209. Then, the wireless base station N compares the metrics reported from the plurality of wireless terminals 200, selects a wireless terminal 200 having the greatest metric, and permits the selected wireless terminal 200 to be newly connected. In FIG. 6, the wireless base station N permits the wireless terminal k to be newly connected.

In ST211, the wireless base station N notifies the wireless terminal k, which the wireless base station N permitted in ST210 to be newly connected, of change information instructing the wireless terminal k to change the serving base station. For example, the change information contains information instructing the wireless terminal k to perform a handover of the serving base station from the wireless base station M to the wireless base station N.

Upon receiving the change information in ST211, the wireless terminal k performs a handover to change the serving base station from the wireless base station M to the wireless base station N in ST212.

After completion of the handover of the wireless terminal k in ST212, the wireless base station N transmits data to the wireless terminal k in ST213, and in ST214, the wireless terminal k receives the data transmitted in ST213.

In a case where the wireless terminal k was permitted in ST210 to be newly connected to the wireless base station N, there occur changes in situation of the number of wireless terminals that are connected to the wireless base station N and the number of wireless terminals that are connected to the wireless base station M. For this reason, in ST215 and ST216, the wireless base station N, which permitted the wireless terminal k to be newly connected, and the wireless base station M, from which the wireless terminal k has been disconnected, update the auxiliary information in the respective wireless base stations.

It should be noted that while the parameter α is notified as the allocation policy in Embodiment 1, this does not imply any limitation. For example, in a case where different predetermined allocation policies are adaptively used for different purposes, an allocation mode may be set for each separate allocation policy and a wireless base station 100 may indicate the allocation mode to a wireless terminal 200. By selecting a serving base station candidate in a manner which is similar to that of Embodiment 1 under the allocation policy corresponding to the allocation mode indicated, the wireless terminal 200 can perform an operation which is similar to that of Embodiment 1.

In Embodiment 1, as described above, a wireless base station 100 notifies a wireless terminal 200 of an allocation policy of the wireless base station 100 and auxiliary information that is used in the calculation of an allocated bandwidth to the wireless terminal 200 by a serving base station candidate at the time of application of the allocation policy. Then, the wireless terminal 200 selects the serving base station candidate on the basis of expected throughput that is calculated from the allocated bandwidth in the case of a connection to each wireless base station 100 using the allocation policy, the auxiliary information, and reception quality measured. Then, each wireless base station 100 chooses, from among a plurality of the wireless terminals 200, a wireless terminal 200 that the wireless base station 100 permits to be newly connected.

This allows the wireless terminal 200 to select an optimum serving base station candidate in accordance with the expected throughput that is calculated from the allocated bandwidth taking into account a desired allocation policy in the allocation of radio resources by the wireless base station 100. Further, on the basis of the expected throughput, the wireless base station 100 can permit a wireless terminal 200 having the greatest expected throughput (metric) of wireless terminals 200 having selected the wireless base station 100 as the serving base station candidate to be newly connected.

For the reasons stated above, Embodiment 1 makes a connection of a wireless terminal 200 to an optimum wireless base station 100 possible in consideration of flexible allocation of radio resources in a system, thus making it possible to maximize the throughput of the whole system.

Further, Embodiment 1 makes it possible to prevent an increase in load of serving base station selection on the side of a network by allowing a wireless terminal 200 to select an optimum serving base station in consideration of system throughput.

Embodiment 2

In the case of a difference in traffic situation between a plurality of wireless base stations adjacent to each other or in the case of a transient state where the traffic situation changes, even an allocation policy that is effective in serving base station selection for a first wireless base station may not be effective for a second wireless base station that is in a different traffic situation. In such a case, the second wireless base station may not be able to select an optimum serving base station, To address this problem, Embodiment 2 describes a case of adaptively switching between a plurality of different allocation policies in the allocation of radio resources by a wireless base station.

Figure 7:
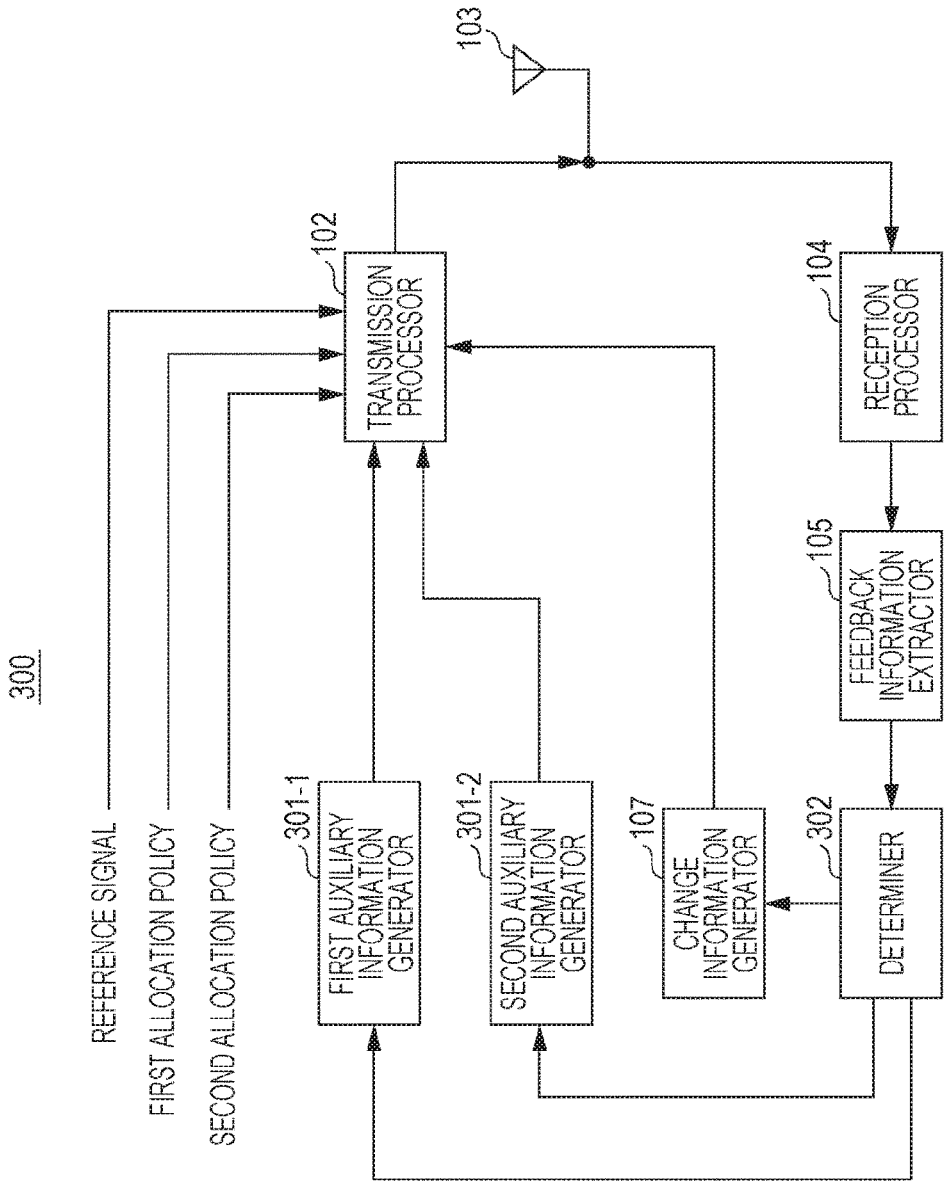
FIG. 7 shows a configuration of a wireless base station according to Embodiment 2.
Figure 8:
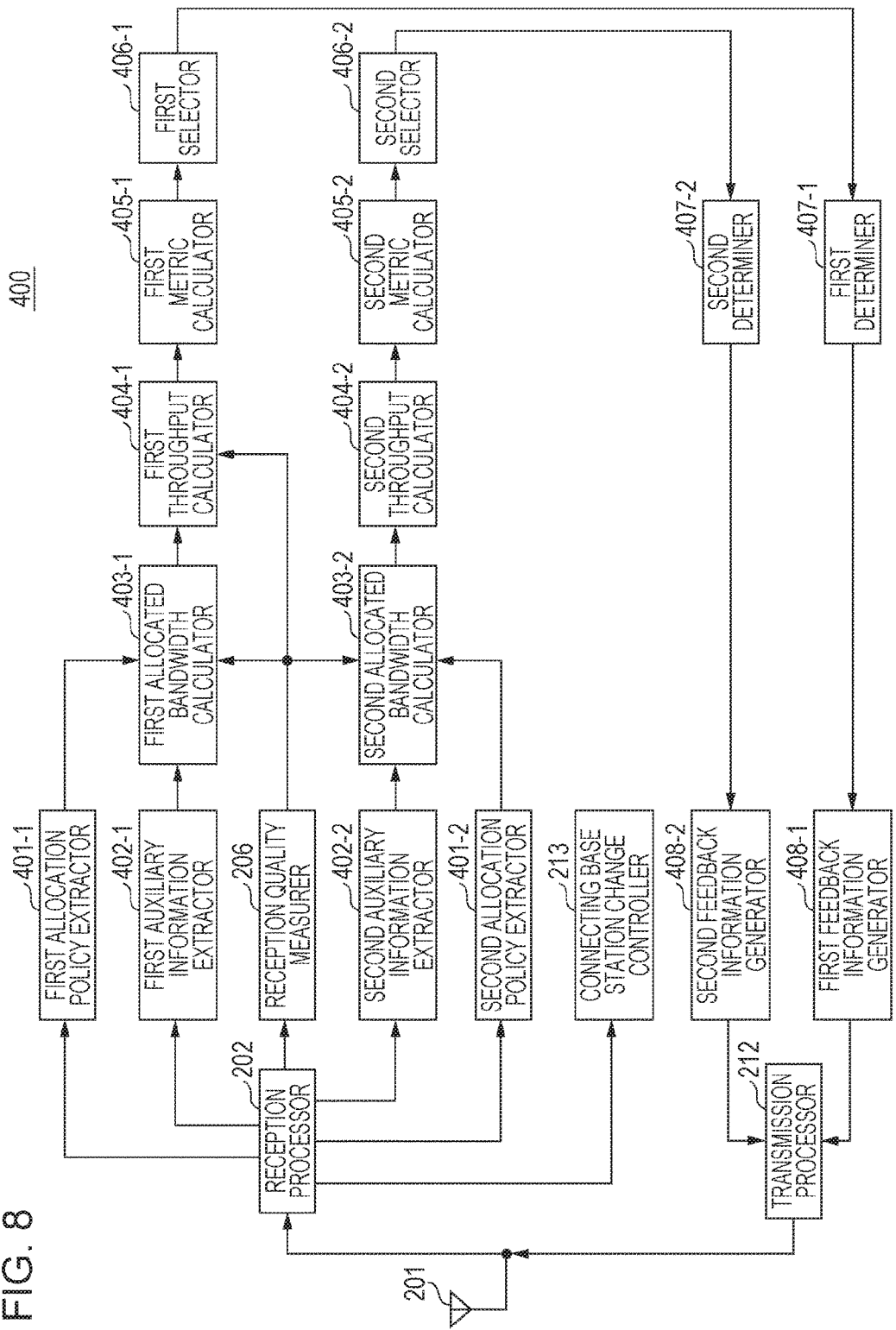
FIG. 8 shows a configuration of a wireless terminal according to Embodiment 2.

FIG. 7 is a block diagram showing a configuration of a wireless base station 300 according to Embodiment 2, and FIG. 8 is a block diagram showing a configuration of a wireless terminal 400 according to Embodiment 2. It should be noted that, in FIGS. 7 and 8, components which are identical to those of Embodiment 1 (FIGS. 4 and 5) are given identical signs and, as such, are not described.

The wireless base station 300 shown in FIG. 7 differs from that of Embodiment 1 (FIG. 4) in that the wireless base station 300 receives two different wireless resource allocation policies set as a first allocation policy and a second allocation policy, in that the wireless base station 300 includes a first auxiliary information generator 301-1 and a second auxiliary information generator 301-2 that respectively correspond to the two allocation policies, and in terms of how a determiner 302 operates.

Specifically, the first auxiliary information generator 301-1 generates auxiliary information (first auxiliary information) that is needed to calculate an allocated bandwidth that is allocated to a wireless terminal 400 in a case where the wireless terminal 400 is newly connected to the wireless base station 300 to which the first allocation policy is applied.

The second auxiliary information generator 301-2 generates auxiliary information (second auxiliary information) that is needed to calculate an allocated bandwidth that is allocated to a wireless terminal 400 in a case where the wireless terminal 400 is newly connected to the wireless base station 300 to which the second allocation policy is applied.

The transmission processor 102 transmits a transmitted signal containing a reference signal, the first allocation policy, the first auxiliary information, the second allocation policy, and the second auxiliary information to a wireless terminal 400 via the antenna 103.

The reception processor 104 receives feedback information from a wireless terminal 400 via the antenna 103. Feedback information contains, for each of the first and second allocation policies, information (metric) regarding a serving base station candidate selected by the wireless terminal 400 and expected throughput that is expected to be achieved by the wireless terminal 400 in a case where the wireless terminal 400 is connected to the serving base station candidate.

The determiner 302 determines a connection permission for a wireless terminal 400 using information (metric) corresponding to that one of the first and second allocation policies which is applied to the wireless base station 300. For example, the determiner 302 determines, as the wireless terminal to be connected, a wireless terminal 400 that reports the greatest metric in response to the allocation policy applied to the wireless base station 300.

Meanwhile, the wireless terminal 400 shown in FIG. 8 differs from that of Embodiment 1 (FIG. 5) in that the wireless terminal 400 includes a first allocation policy extractor 401-1 to a first feedback information generator 408-1 corresponding to a first allocation policy and a second allocation policy extractor 401-2 to a second feedback information generator 408-2 corresponding to a second allocation policy that is different from the first allocation policy.

It should be noted that the first allocation policy extractor 401-1 to the first feedback information generator 408-1 and the second allocation policy extractor 401-2 to the second feedback information generator 408-2 perform basically the same operations as the allocation policy extractor 203 to the allocated bandwidth calculator 205 and the throughput calculator 207 to the feedback information generator 211 and, as such, are not described here.

The transmission processor 212 generates transmit data using feedback information regarding the first policy that is outputted from the first feedback information generator 408-1 and feedback information regarding the second allocation policy that is outputted from the second feedback information generator 408-2 and generates a transmitted signal by performing transmission processes such as an encoding process and a modulation process on the transmit data thus generated. That is, the wireless terminal 400 feeds back serving base station candidates respectively corresponding to the first and second allocation policies and metrics for the serving base station candidates to a wireless base station 300.

Operation of Wireless Base Station 300 and Wireless Terminal 400

The following details a serving base station selecting method that is used by a wireless base station 300 thus configured and a wireless terminal 400 thus configured.

The wireless base station 300 notifies the wireless terminal 400 of a plurality of different allocation policies. Further, the wireless base station 300 notifies, as auxiliary information, a combined value of frequency usage efficiency of all wireless terminals 400 connected to the wireless base station 300 in a case where each of the plurality of different allocation policies is applied.

Meanwhile, the wireless terminal 400 calculates, using the plurality of allocation policies thus notified, the auxiliary information corresponding to each allocation policy, and reception quality measured by the wireless terminal 400, an allocated bandwidth that is allocated in a case where the wireless terminal 400 is connected to each of a plurality of the wireless base stations 300 and selects, as a serving base station candidate, a wireless base station 300 for which the greatest expected throughput is calculated from the allocated bandwidth thus calculated. That is, the wireless terminal 400 separately selects serving base station candidates in a case where each of the plurality of different allocation policies is applied.

That is, for example, in a case of having been notified of two different allocation policies, the wireless terminal 400 selects one serving base station candidate for each separate allocation policy and reports a total of two serving base station candidates to the wireless base station 300. It should be noted that feedback information from the wireless terminal 400 to the wireless base station 300 contains a serving base station candidate for each of the plurality of allocation policies and a metric for the serving base station candidate.

It should be noted that the method by which the wireless terminal 400 selects a serving base station candidate under each allocation policy is the same as that of Embodiment 1 and, as such, is not described here.

Then, the wireless base station 300 chooses, on the basis of the serving base station candidates corresponding to the plurality of allocation policies as reported from the wireless terminal 400, a wireless base station to which the wireless terminal 400 is permitted to be connected.

For example, on the basis of a traffic situation at the point in time where the wireless base station 300 chooses the serving base station for the wireless terminal 400, the wireless base station 300 chooses the serving base station using that one of the plurality of allocation policies which the wireless base station 300 judges to be best suitable. For example, the wireless base station 300 determines a connection permission for the wireless terminal 400 using the metric of the wireless terminal 400 corresponding to that one of the plurality of allocation policies which is applied on the basis of the traffic situation or the like. It should be noted that the method by which the wireless base station 300 chooses a serving base station is the same as that of Embodiment 1 and, as such, is not described here.

Thus, in Embodiment 2, the wireless base station 300 notifies the wireless terminal 400 of a plurality of allocation policies, and the wireless terminal 400 selects an optimum serving base station candidate for each allocation policy and feeds back, to the wireless base station 300, a serving base station candidate and a metric in a case where each allocation policy is applied.

This allows the wireless base station 300 to choose a serving base station after judging which wireless terminal 400 to connect to which wireless base station to maximize system throughput under that one of the plurality of allocation policies which is actually applied. This makes it possible to maximize system throughput even in a case where a plurality of different allocation policies are adaptively used for different purposes.

Further, since, in Embodiment 2, the wireless terminal 400 selects serving base station candidates for a plurality of allocation policies, the wireless base station 300 can change from applying a first allocation policy to applying a second allocation policy, for example, according to changes in traffic situation and quickly choose an optimum serving base station for the wireless terminal 400 under the second allocation policy.

Thus, Embodiment 2 makes it possible to flexibly and quickly achieve an optimum base station connection for the wireless terminal 400 according to changes in situation such as traffic, thus making it possible to maximize system throughput.

Further, with consideration given to an actual communication system, an allocation policy is information regarding an operator's network operation, and from the point of view of ensuring security in network management, it is considered that an allocation policy should avoid being notified in such a manner that someone other than the operator, including a user, can easily see it. From such a point of view, as in the case of Embodiment 2, setting a plurality of allocation policies and making the wireless terminal 400 always report information (feedback information) regarding each allocation policy brings about an effect of making it possible to allocate radio resources by flexibly switching between allocation policies without notifying what allocation policy the operation is actually applying.

It should be noted that while Embodiment 2 has described a case where feedback information contains serving base station candidates for each separate one of the plurality of allocation policies and the metrics of the serving base station candidates, this does not imply any limitation, For example, the wireless terminal 400 may feed back serving base station candidates for the plurality of allocation policies and the metrics of the serving base station candidates one by one in sequence for each single allocation policy. Further, the wireless terminal 400 may set the plurality of allocation policies in order of priority and feed back information regarding an allocation policy according to the order of priority. All this allows the wireless terminal 400 to feed back information that is needed for the plurality of allocation policies, even with a limit on the amount of information that can be fed back.

Further, while FIGS. 7 and 8 have described a case where two different allocation policies are used, the number of allocation policies that are used may be 3 or more.

Embodiment 3

Embodiment 3 describes a case where the serving base station selecting method described in Embodiment 1 is applied to an LTE system.

An LTE system applies carrier aggregation in which a plurality of carriers (component carriers) of different frequencies are bundled together for operation. The plurality of carriers may be transmitted from different wireless base stations.

That is, in carrier aggregation, a carrier that is transmitted from one wireless base station and a carrier of a different frequency that is transmitted from another wireless base station can be bundled together. Further, the plurality of carriers that are bundled together are classified into main carriers (i.e, primary cells; hereinafter referred to as "P cells") and the other carriers (i.e. secondary cells; hereinafter referred to as "S cells"). An example of a method of operation is a method in which a P cell bears the control function of, for example, notifying control information and an S cell bears the function of transmitting data.

A case is assumed here where different wireless base stations serve as a P cell and an S cell for each wireless terminal. Furthermore, a case is assumed where the difference between wireless base stations serving as S cells that transmit data makes a difference in system throughput.

Given these circumstances, Embodiment 3 describes a case where the serving base station selecting method described in Embodiment 1 is applied in selecting a wireless base station that serves as an S cell.

Figure 9:
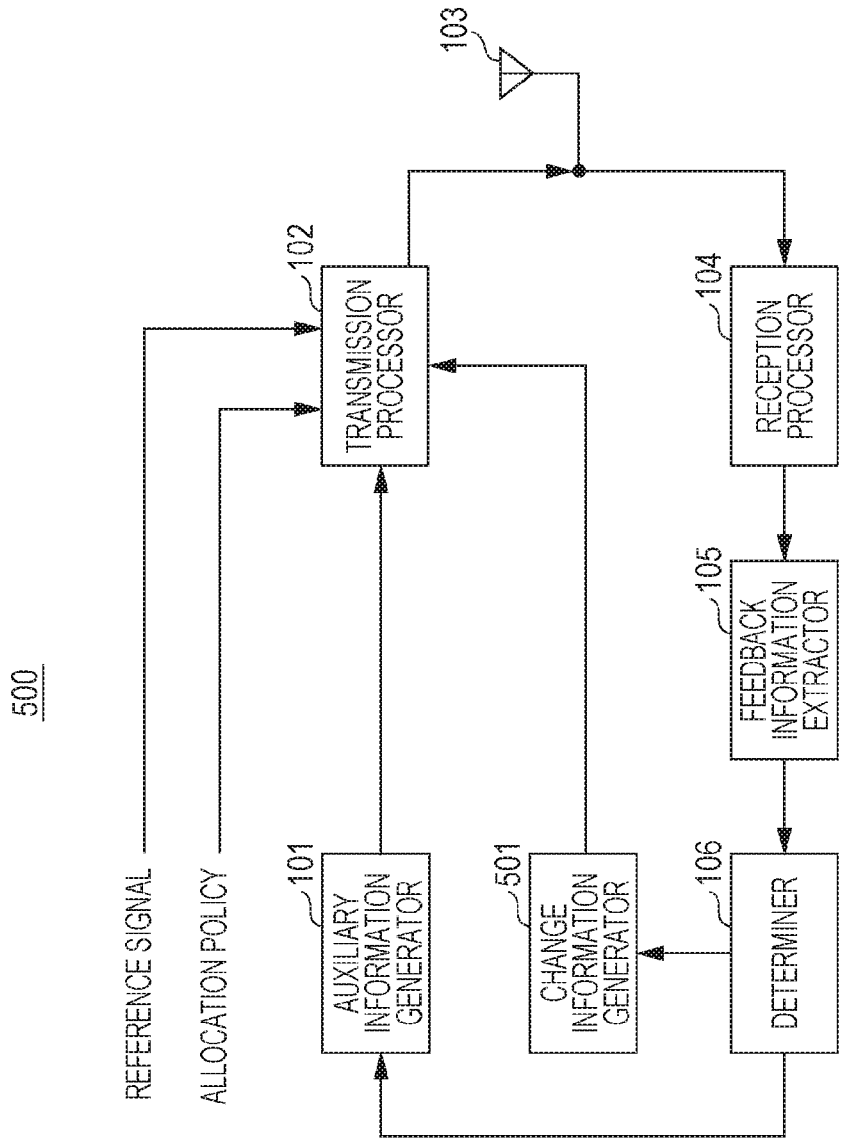
FIG. 9 shows a configuration of a wireless base station according to Embodiment 3.
Figure 10:
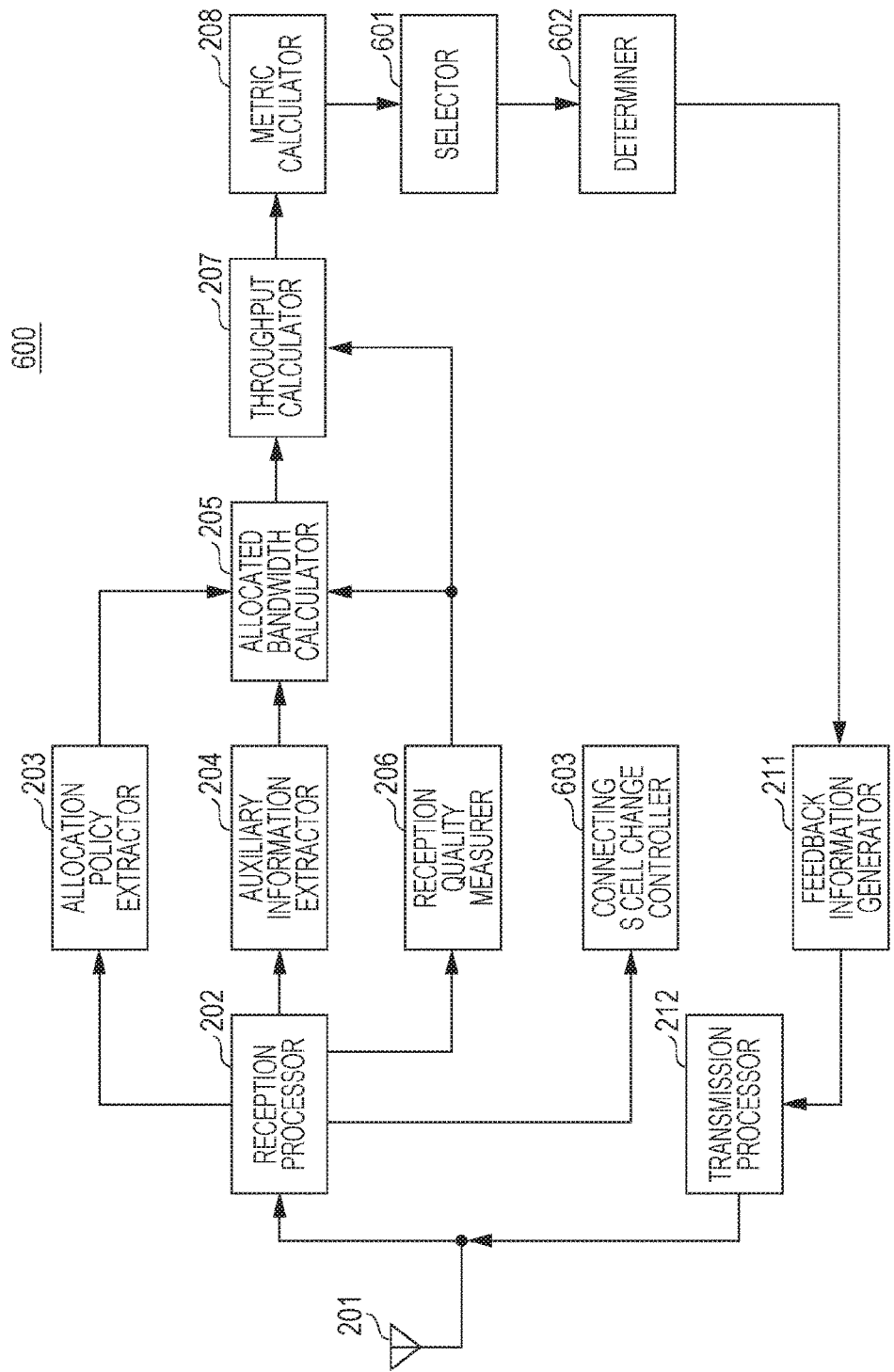
FIG. 10 shows a configuration of a wireless terminal according to Embodiment 3.

FIG. 9 is a block diagram showing a configuration of a wireless base station 500 according to Embodiment 3, and FIG. 10 is a block diagram showing a configuration of a wireless terminal 600 according to Embodiment 3. It should be noted that, in FIGS. 9 and 10, components which are identical to those of Embodiment 1 (FIGS. 4 and 5) are given identical signs and, as such, are not described.

The wireless base station 500 is for example a wireless base station serving as a P cell. The wireless base station 500 chooses, from among at least one wireless base station serving as an S cell, a wireless base station corresponding to an S cell that is allocated to the wireless terminal 600.

The wireless base station 500 shown in FIG. 9 differs from that of Embodiment 1 (FIG. 4) in terms of how a change information generator 501 operates.

The change information generator 501 is identical in basic operation to the change information generator 107 of the wireless base station 100 of Embodiment 1 (FIG. 4). Upon receiving, from the determiner 106 for the wireless terminal 600 connected to the wireless base station 500, information indicating the occurrence of a change of the wireless base station corresponding to the S cell to which the wireless terminal 600 is connected, the change information generator 501 generates change information indicating to the wireless terminal 600 to be changed that there will be a change of the connecting S cell (i.e. wireless base station). As with other information, the change information thus generated is inputted to the transmission processor 102 and subjected to transmission processes.

Meanwhile, the wireless terminal 600 shown in FIG. 10 differs from that of Embodiment 1 (FIG. 5) in terms of how a selector 601, a determiner 602, and a connecting S cell change controller 603 operate.

The selector 601 is identical in basic operation to the selector 209 of the wireless terminal 200 of Embodiment 1 (FIG. 5). The selector 601 selects, from among a plurality of wireless base station that can be an S cell for the wireless terminal 600, a wireless base station for which the greatest metric is calculated from the metric calculator 208.

The determiner 602 is identical in basic operation to the determiner 210 of the wireless terminal 200 of Embodiment 1 (FIG. 5). The determiner 602 determines whether a connecting S cell candidate selected by the selector 601 is identical to the connecting S cell to which the wireless terminal 600 has originally been connected. Moreover, in a case where the selected connecting S cell candidate is identical to the connecting S cell to which the wireless terminal 600 has originally been connected, the determiner 602 determines to continue communication with the connecting S cell without changing the connecting S cell, On the other hand, in a case where the selected connecting S cell candidate is different from the connecting S cell to which the wireless terminal 600 has originally been connected, the determiner 602 determines to change the connecting S cell. In a case of having determined to change the connecting S cell, the determiner 602 outputs the selected connecting S cell candidate and a metric regarding the connecting S cell candidate to the feedback information generator 211.

The connecting S cell change controller 603 controls connection switching of wireless base stations serving as S cells in accordance with an instruction from the wireless base station 500 to connect to the connecting S cell candidate. Specifically, in response to an instruction from the wireless base station 500 for the wireless terminal 600 to change the connecting S cell, the connecting S cell change controller 603 extracts change information from receive data that is outputted from the reception processor 202 and controls a change of the connecting S cell in accordance with an instruction indicated by the change information.

The following describes an example of a specific method for realizing the aforementioned connecting S cell selecting method.

FIG. 11 is a flow chart showing a procedure that a P cell (wireless base station 500), an S cell #1, an S cell #2, and a wireless terminal k (wireless terminal 600) perform in an example of a connecting S cell selecting method.

It should be noted that the wireless terminal k is connected to the P cell and the S cell #1 before the process shown in FIG. 11.

Further, in FIG. 11, the P cell serves as both a source that notifies the wireless terminal k of control information and a destination to which the wireless terminal k reports feedback information, That is, the P cell gathers auxiliary information for the wireless terminal k to calculate allocated bandwidths in the S cells #1 and #2 and notifies the wireless terminal k of the auxiliary information together.

FIG. 11 describes a procedure by which the wireless terminal k switches the connecting S cell from the S cell #1 to the S cell #2.

In ST301, the P cell broadcasts, to wireless terminals 600 (including the wireless terminal k) surrounding the P cell, an allocation policy that is applied to the P cell.

In ST302, the S cell #1 notifies the P cell of auxiliary information for calculating an allocated bandwidth in the S cell #1. In ST303, the S cell #2 notifies the P cell of auxiliary information for calculating an allocated bandwidth in the S cell #2. For example, the auxiliary information is equivalent to equation (13) or (15).

It should be noted the P cell is notified of auxiliary information for each wireless base station from wireless base stations other than the S cells #1 and #2 (i.e. wireless base stations that can be a connecting S cell candidate).

In ST304, the P cell notifies the wireless terminal k of auxiliary information regarding wireless base stations surrounding the wireless terminal k, including the auxiliary information notified from the S cells #1 and #2 in ST302 and ST303.

In ST305, the wireless terminal k calculates an allocated bandwidth for each wireless base station using the allocation policy notified from the P cell in ST301 and the auxiliary information of the surrounding wireless base stations as notified from the P cell in ST304. The wireless terminal k calculates, for example, the allocated bandwidth ($w\sim_{k,n}$) of the wireless base station n according to equation (12).

In ST306, the S cell #1 transmits a reference signal, and in ST307, the S cell #2 transmits a reference signal. It should be noted that the surrounding wireless base stations other than the S cells #1 and #2 also transmit reference signals.

In ST308, the wireless terminal k measures reception quality regarding the S cell #1 and reception quality regarding the S cell #2 with reference to the reference signals respectively transmitted from the S cells #1 and #2 in ST306 and ST307. It should be noted that the wireless terminal k also measures reception quality with reference to the reference signals transmitted from the surrounding wireless base stations other than the S cells #1 and #2.

The wireless terminal k calculates, for example, $r_{k,n}$ included in equations (12) and (14) from the measured reception quality of the wireless base station n, which can be a connecting S cell candidate.

In ST309, the wireless terminal k calculates, on the basis of the allocated bandwidth (which is equivalent to $w\sim_{k,n}$) by each wireless base station as calculated in ST305 and the reception quality (which is equivalent to $r_{k,n}$) regarding each wireless base station as measured in ST308, expected throughput that is expected to be achieved by the wireless terminal k in a case where the wireless terminal k is connected to each wireless base station, Further, in ST309, the wireless terminal k calculates a metric for each wireless base station using the expected throughput thus calculated. The metric is equivalent, for example, to equation (14).

Further, in ST309, the wireless terminal k selects a connecting S cell candidate on the basis of the metric for each wireless base station. An example of a connecting S cell selecting method is the serving base station selecting method shown in FIG. 1. That is, the wireless terminal k selects, as the connecting S cell candidate, a wireless base station having the greatest metric of the metrics thus calculated, It should be noted that, in FIG. 11, the wireless terminal k selects the S cell #2 as the connecting S cell candidate.

Further, in ST309, the wireless terminal k determines whether the selected connecting S cell candidate is identical to the current connecting S cell. In FIG. 11, the wireless terminal k determines that the S cell #2, which is the selected connecting S cell candidate, is different from the S cell #1, to which the wireless terminal k is currently connected.

In a case where the wireless terminal k has judged in ST309 that the connecting S cell candidate is different from the connecting S cell, the wireless terminal k reports feedback information containing the metric regarding the selected connecting S cell candidate to the P cell in ST310. In FIG. 11, since the S cell #2 is selected as the connecting S cell candidate, the wireless terminal k reports the connecting S cell candidate (S cell #2) the metric regarding the S cell #2 to the P cell.

In ST311, in a case where other wireless terminals 600 (not illustrated) have selected the S cell #2 as the connecting S cell candidate, the P cell also receives metrics from these wireless terminals 600 in a manner which is similar to that in which the P cell receives a metric from the wireless terminal k in ST310. Then, the P cell compares the metrics reported from the plurality of wireless terminals 600, selects a wireless terminal 600 having the greatest metric, and permits the selected wireless terminal 600 to be newly connected to the S cell #2. In FIG. 11, the P cell permits the wireless terminal k to be newly connected to the S cell #2.

In ST312, the P cell notifies the wireless terminal k, which the P cell permitted in ST311 to be newly connected to the S cell #2, of change information instructing the wireless terminal k to change the connecting S cell. Upon receiving the change information in ST312, the wireless terminal k changes the connecting S cell from the S cell #1 to the S cell #2 in ST313.

In ST314, the P cell instructs the S cell #1, which is the current connecting S cell, and the S cell #2, which is the new connecting S cell, to change the connecting S cell for the wireless terminal k. In ST315, the S cell #1 stops transmitting data to the wireless terminal k. That is, the S cell #1 finishes functioning as an S cell for the wireless terminal k.

After completion of the switching of S cells for the wireless terminal k in ST314, the S cell #2 transmits data to the wireless terminal k in ST316, and in ST317, the wireless terminal k receives the data transmitted in ST316. That is, the S cell #2 starts functioning as an S cell for the wireless terminal k.

In a case where the S cell #2 replaces the S cell #1 in ST313 as a wireless base station that serves as an S cell for the wireless terminal k, there occur changes in situation of the number of wireless terminals that are connected to the S cell #1 and the number of wireless terminals that are connected to the S cell #2. For this reason, in ST318 and ST319, the S cell #2, which is a new connecting S cell for the wireless terminal k, and the S cell #1, from which the wireless terminal k has been disconnected, update the auxiliary information in the respective S cells.

Thus, in a case of choosing a wireless base station that serves as an S cell for the wireless terminal 600, the wireless terminal 600, as in the case of Embodiment 1, can select an optimum connecting S cell candidate in accordance with the expected throughput that is calculated from the allocated bandwidth taking into account a desired allocation policy in the allocation of radio resources by a wireless base station that can be the connecting S cell candidate. Further, on the basis of the expected throughput, the wireless base station 500, which serves as the P cell, can permit a wireless terminal 600 having the greatest expected throughput (metric) of wireless terminals 600 having selected the same connecting S cell candidate to be newly connected to the connecting S cell candidate.

For the reasons stated above, Embodiment 3 makes a connection of a wireless terminal 600 to an optimum S cell possible in consideration of flexible allocation of radio resources in an LTE system, thus making it possible to maximize the throughput of the whole system.

Further, in carrier aggregation in an LTE system, it is not necessary to be conscious of a wireless base station in selecting an S cell. For example, even in a case where a plurality of carriers are supported by the same wireless station, there are differences in propagation situations due to the differences in frequency among the carriers, and there are differences in traffic situations or interference situations due to differences among the wireless terminals connected. For this reason, each carrier supported by the same wireless base station can be recognized as a separate carrier from the other. Given these circumstances, Embodiment 3 applies the serving base station selecting method described in Embodiment 1 to the selection of each carrier in the selection of an S cell, thus making it possible to maximize system throughput without being conscious of a wireless base station.

The foregoing has described each embodiment of the present disclosure.

It should be noted that while each embodiment has been described above with reference to a case where a wireless terminal feeds back a metric regarding expected throughput to a wireless base station, the wireless terminal may feed back the expected throughput to the wireless base station.

Further, while each embodiment has been described above by taking, as an example, a case where an aspect of the present disclosure is configured by hardware, the present disclosure can also be realized by software in cooperation with hardware.

Further, each functional block used in the description of each embodiment described above can be typically realized by an LSI such as an integrated circuit. The integrated circuit may control each functional block used in the description of each embodiment described above and include an input and an output coupled thereto. These LSIs may be individually formed as one chip, or one chip may be formed so as to include a part or all of the functional blocks. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

A wireless base station according to the present disclosure includes: a transmitter that transmits first information indicating an allocation policy that determines system performance and second information regarding an allocated bandwidth that is allocated to a wireless terminal in a case where the allocation policy is applied; a receiver that receives, from each of a plurality of the wireless terminals, third information regarding a serving base station candidate and throughput that is achieved in a case where the wireless terminal is connected to the serving base station candidate, the serving base station candidate being a wireless base station for which the greatest throughput is calculated from the allocated bandwidth calculated using the first information, the second information, and reception quality; and circuitry that controls, on the basis of the third information, a connection to a wireless terminal having the greatest throughput.

In the wireless base station according to the present disclosure, the second information indicates a combined value of frequency usage efficiency of all wireless terminals connected to the wireless base station in a case where the allocation policy is applied.

In the wireless base station according to the present disclosure, the allocated bandwidth is calculated using a proportion of frequency usage efficiency of a wireless terminal to a total of a combined value of frequency usage efficiency of all wireless terminals connected to the wireless base station in a case where the allocation policy is applied and the frequency usage efficiency of the wireless terminal in a case where the allocation policy is applied, the frequency usage efficiency of the wireless terminal being calculated using the reception quality.

In the wireless base station according to the present disclosure, the throughput is calculated from the allocated bandwidth and the reception quality, and the higher the throughput is, the greater value the third information indicates.

In the wireless base station according to the present disclosure, in a case where there has occurred a change from connecting to a first wireless terminal to connecting a second wireless terminal, the second information is updated on the basis of the second wireless terminal.

In the wireless base station according to the present disclosure, the transmitter transmits the first information indicating a plurality of the allocation policies, the receiver receives the third information corresponding to each of the plurality of the allocation policies, and the circuitry controls a connection to a wireless terminal using the third information corresponding to that one of the plurality of the allocation policies which is applied to the wireless base station.

In the wireless base station according to the present disclosure, the wireless base station is a wireless base station that corresponds to a secondary cell (S cell) in carrier aggregation.

A wireless terminal according to the present disclosure includes: a receiver that receives first information indicating an allocation policy that determines system performance and second information regarding an allocated bandwidth that is allocated to the wireless terminal by each of a plurality of wireless base stations to which the allocation policy is applied; circuitry that measures reception quality with respect to each of the plurality of wireless base stations, calculates the allocated bandwidth for each of the plurality of wireless base stations using the first information, the second information, and the reception quality, calculates throughput for each of the plurality of wireless base stations using the allocated bandwidth and the reception quality, selects a wireless base station for which the greatest throughput has been calculated as a serving base station candidate from among the plurality of wireless base stations, and controls connection switching of wireless base stations; and a transmitter that transmits third information regarding the serving base station candidate and the throughput corresponding to the serving base station candidate.

A communication control method according to the present disclosure includes: transmitting first information indicating an allocation policy that determines system performance and second information regarding an allocated bandwidth that is allocated to a wireless terminal in a case where the allocation policy is applied; receiving, from each of a plurality of the wireless terminals, third information regarding a serving base station candidate and throughput that is achieved in a case where the wireless terminal is connected to the serving base station candidate, the serving base station candidate being a wireless base station for which the greatest throughput is calculated from the allocated bandwidth calculated using the first information, the second information, and reception quality; and controlling, on the basis of the third information, a connection to a wireless terminal having the greatest throughput.

A communication control method according to the present disclosure includes: receiving first information indicating an allocation policy that determines system performance and second information regarding an allocated bandwidth that is allocated to a wireless terminal by each of a plurality of wireless base stations to which the allocation policy is applied; measuring reception quality with respect to each of the plurality of wireless base stations; calculating the allocated bandwidth for each of the plurality of wireless base stations using the first information, the second information, and the reception quality; calculating throughput for each of the plurality of wireless base stations using the allocated bandwidth and the reception quality; selecting a wireless base station for which the greatest throughput has been calculated as a serving base station candidate from among the plurality of wireless base stations; transmitting third information regarding the serving base station candidate and the throughput corresponding to the serving base station candidate; and controlling connection switching of wireless base stations.

An aspect of the present disclosure is useful in a mobile communication system.

What is claimed is:

1. A wireless base station comprising:
    a transmitter, which, in operation, transmits first information indicating an allocation policy that determines system performance and second information regarding an allocated bandwidth that is allocated to a wireless terminal in a case where the allocation policy is applied;
    a receiver, which, in operation, receives, from each of a plurality of the wireless terminals, third information regarding a serving base station candidate and throughput that is achieved in a case where the wireless terminal is connected to the serving base station candidate, the serving base station candidate being a wireless base station for which the greatest throughput is calculated from the allocated bandwidth calculated using the first information, the second information, and reception quality; and
    circuitry, which, in operation, controls, on the basis of the third information, a connection to a wireless terminal having the greatest throughput.

2. The wireless base station according to claim 1, wherein the second information indicates a combined value of frequency usage efficiency of all wireless terminals connected to the wireless base station in a case where the allocation policy is applied.

3. The wireless base station according to claim 1, wherein the allocated bandwidth is calculated using a proportion of frequency usage efficiency of a wireless terminal to a total of a combined value of frequency usage efficiency of all wireless terminals connected to the wireless base station in a case where the allocation policy is applied and the frequency usage efficiency of the wireless terminal in a case where the allocation policy is applied, the frequency usage efficiency of the wireless terminal being calculated using the reception quality.

4. The wireless base station according to claim 1, wherein the throughput is calculated from the allocated bandwidth and the reception quality, and
    the higher the throughput is, the greater value the third information indicates.

5. The wireless base station according to claim 1, wherein in a case where there has occurred a change from connecting to first wireless terminals to connecting second wireless terminals, the second information is updated on the basis of the second wireless terminal.

6. The wireless base station according to claim 1, wherein the transmitter, in operation, transmits the first information indicating a plurality of the allocation policies,
    the receiver, in operation, receives the third information corresponding to each of the plurality of the allocation policies, and
    the circuitry, in operation, controls a connection to a wireless terminal using the third information corresponding to that one of the plurality of the allocation policies which is applied to the wireless base station.

7. The wireless base station according to claim 1, wherein the wireless base station is a wireless base station that corresponds to a secondary cell (S cell) in carrier aggregation.

8. A wireless terminal comprising:
    a receiver, which, in operation, receives first information indicating an allocation policy that determines system performance and second information regarding an allocated bandwidth that is allocated to the wireless terminal by each of a plurality of wireless base stations to which the allocation policy is applied;
    circuitry, which, in operation;
        measures reception quality with respect to each of the plurality of wireless base stations;

calculates the allocated bandwidth for each of the plurality of wireless base stations using the first information, the second information, and the reception quality;
  calculates throughput for each of the plurality of wireless base stations using the allocated bandwidth and the reception quality;
  selects a wireless base station for which the greatest throughput has been calculated as a serving base station candidate from among the plurality of wireless base stations; and
  controls connection switching of wireless base stations; and
a transmitter, which, in operation, transmits third information regarding the serving base station candidate and the throughput corresponding to the serving base station candidate.

9. A communication control method comprising:
transmitting first information indicating an allocation policy that determines system performance and second information regarding an allocated bandwidth that is allocated to a wireless terminal in a case where the allocation policy is applied;
receiving, from each of a plurality of the wireless terminals, third information regarding a serving base station candidate and throughput that is achieved in a case where the wireless terminal is connected to the serving base station candidate, the serving base station candidate being a wireless base station for which the greatest throughput is calculated from the allocated bandwidth calculated using the first information, the second information, and reception quality; and
controlling, on the basis of the third information, a connection to a wireless terminal having the greatest throughput.

10. A communication control method comprising:
receiving first information indicating an allocation policy that determines system performance and second information regarding an allocated bandwidth that is allocated to a wireless terminal by each of a plurality of wireless base stations to which the allocation policy is applied;
measuring reception quality with respect to each of the plurality of wireless base stations;
calculating the allocated bandwidth for each of the plurality of wireless base stations using the first information, the second information, and the reception quality;
calculating throughput for each of the plurality of wireless base stations using the allocated bandwidth and the reception quality;
selecting a wireless base station for which the greatest throughput has been calculated as a serving base station candidate from among the plurality of wireless base stations;
transmitting third information regarding the serving base station candidate and the throughput corresponding to the serving base station candidate; and
controlling connection switching of wireless base stations.

* * * * *